(12) United States Patent
Chapman et al.

(10) Patent No.: US 9,713,906 B2
(45) Date of Patent: Jul. 25, 2017

(54) CUP-FORMING PROCESS AND MACHINE

(71) Applicant: Berry Plastics Corporation, Evansville, IN (US)

(72) Inventors: Kody A Chapman, Boonville, IN (US); Randy A Bowlds, Evansville, IN (US); Charles T Wallace, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 745 days.

(21) Appl. No.: 13/961,411

(22) Filed: Aug. 7, 2013

(65) Prior Publication Data

US 2014/0041785 A1    Feb. 13, 2014

Related U.S. Application Data

(60) Provisional application No. 61/737,236, filed on Dec. 14, 2012, provisional application No. 61/680,568, filed on Aug. 7, 2012.

(51) Int. Cl.
| | |
|---|---|
| B29D 24/00 | (2006.01) |
| B29D 22/00 | (2006.01) |
| B29C 35/02 | (2006.01) |
| B29C 37/00 | (2006.01) |

(52) U.S. Cl.
CPC ............ B29D 24/002 (2013.01); B29C 35/02 (2013.01); B29D 22/003 (2013.01); *B29C 2037/90* (2013.01); *B31B 2201/2616* (2013.01); *B31B 2201/61* (2013.01); *B31B 2217/062* (2013.01); *B31B 2217/064* (2013.01); *B31B 2217/082* (2013.01); *Y10T 156/1002* (2015.01)

(58) Field of Classification Search
None
See application file for complete search history.

(56) References Cited

U.S. PATENT DOCUMENTS

| | | | |
|---|---|---|---|
| 1,396,282 | A | 11/1921 | Penn |
| 1,435,120 | A | 11/1922 | Holman |
| 1,920,529 | A | 8/1933 | Sidebotham |
| 1,969,030 | A | 8/1934 | Page |
| 2,097,899 | A | 12/1935 | Smith |
| 2,809,776 | A | 3/1956 | Barrington |

(Continued)

FOREIGN PATENT DOCUMENTS

| | | |
|---|---|---|
| BE | 898053 | 4/1984 |
| CA | 2291607 | 6/2000 |

(Continued)

OTHER PUBLICATIONS

"Daploy(TM) HMS Polypropylene for Foam Extrusion", obtained from Borealis webpage obtained from the Internet Archive\s "Wayback Machine" as of Nov. 16, 2008 https://web.archive.org/web/20081116085125/http://www.borealisgroup.com/pdf/literature/borealisborouge/brochure/K_IN0020_GB_FF_2007_10_BB.pdf).

(Continued)

*Primary Examiner* — Jeff Aftergut
*Assistant Examiner* — Jaeyun Lee
(74) *Attorney, Agent, or Firm* — Barnes & Thornburg LLP

(57) ABSTRACT

A cup-forming machine includes having a male mandrel and a female receiver. The male mandrel uses a cup body blank and a floor blank to form a body of a cup. The female receive receives the body and forms a rolled brim on the body to establish a cup.

42 Claims, 12 Drawing Sheets

(56) References Cited

U.S. PATENT DOCUMENTS

| | | | |
|---|---|---|---|
| 3,221,954 A | 12/1965 | Lux | |
| 3,227,784 A | 1/1966 | Blades | |
| 3,252,387 A | 5/1966 | Milton | |
| 3,290,198 A | 12/1966 | Lux | |
| 3,311,383 A | 4/1967 | Shapiro | |
| 3,327,038 A | 6/1967 | Fox | |
| 3,327,103 A | 6/1967 | Bonnet | |
| 3,344,222 A * | 9/1967 | Hill | B29C 67/221 264/321 |
| 3,381,880 A | 5/1968 | Lewallen et al. | |
| 3,409,204 A | 11/1968 | Carle | |
| 3,431,163 A | 3/1969 | Harold | |
| 3,468,467 A | 9/1969 | Amberg | |
| 3,547,012 A | 12/1970 | Amberg | |
| 3,583,624 A | 6/1971 | Peacock | |
| 3,658,615 A | 4/1972 | Amberg | |
| 3,661,282 A | 5/1972 | Buhayar | |
| 3,733,381 A | 5/1973 | Willette | |
| 3,793,283 A | 2/1974 | Frailey | |
| 3,846,349 A | 11/1974 | Harada | |
| 3,907,193 A | 9/1975 | Heller | |
| 3,919,368 A | 11/1975 | Seto | |
| RE28,658 E | 12/1975 | Macdaniel | |
| 3,967,991 A | 7/1976 | Shimano | |
| 3,969,173 A | 7/1976 | Amberg | |
| 3,971,696 A | 7/1976 | Manfredi | |
| 3,973,721 A | 8/1976 | Nakane | |
| 3,981,412 A | 9/1976 | Asmus | |
| 4,026,458 A * | 5/1977 | Morris | B65D 1/28 229/170 |
| 4,049,122 A | 9/1977 | Maxwell | |
| 4,070,513 A | 1/1978 | Rhoads | |
| 4,106,397 A | 8/1978 | Amberg | |
| 4,171,085 A | 10/1979 | Doty | |
| 4,197,948 A | 4/1980 | Amberg | |
| 4,240,568 A | 12/1980 | Pool | |
| 4,284,226 A | 8/1981 | Herbst | |
| 4,288,026 A | 9/1981 | Wilhelm | |
| 4,298,331 A | 11/1981 | Mueller | |
| 4,299,349 A | 11/1981 | Gilden | |
| 4,300,891 A | 11/1981 | Bemiss | |
| 4,306,849 A | 12/1981 | Cress | |
| 4,310,369 A | 1/1982 | Miller | |
| 4,349,400 A | 9/1982 | Gilden | |
| 4,365,460 A | 12/1982 | Cress | |
| 4,391,666 A | 7/1983 | Mueller | |
| 4,409,045 A | 10/1983 | Busse | |
| 4,490,130 A | 12/1984 | Konzal | |
| 4,550,046 A | 10/1985 | Miller | |
| 4,579,275 A | 4/1986 | Peelman | |
| 4,604,324 A | 8/1986 | Nahmias | |
| 4,621,763 A | 11/1986 | Brauner | |
| 4,706,873 A | 11/1987 | Schulz | |
| 4,720,023 A | 1/1988 | Jeff | |
| 4,856,989 A | 8/1989 | Siebert | |
| 4,878,970 A | 11/1989 | Schubert | |
| 4,918,112 A | 4/1990 | Roox | |
| 4,940,736 A | 7/1990 | Alteepping | |
| 5,078,817 A | 1/1992 | Takagaki | |
| 5,116,881 A | 5/1992 | Park | |
| 5,149,579 A | 9/1992 | Park | |
| 5,158,986 A | 10/1992 | Cha | |
| 5,160,674 A | 11/1992 | Colton | |
| 5,180,751 A | 1/1993 | Park | |
| 5,236,963 A | 8/1993 | Jacoby | |
| 5,256,462 A | 10/1993 | Callahan | |
| 5,286,428 A | 2/1994 | Hayashi | |
| 5,308,568 A | 5/1994 | Lipp | |
| 5,348,795 A | 9/1994 | Park | |
| 5,366,791 A | 11/1994 | Carr | |
| 5,385,260 A | 1/1995 | Gatcomb | |
| 5,443,769 A | 8/1995 | Karabedian | |
| 5,445,315 A | 8/1995 | Shelby | |
| 5,490,631 A | 2/1996 | Iioka | |
| 5,507,640 A | 4/1996 | Gilmer | |
| 5,547,124 A | 8/1996 | Mueller | |
| 5,549,864 A | 8/1996 | Greene | |
| 5,605,936 A | 2/1997 | DeNicola, Jr. | |
| 5,622,308 A | 4/1997 | Ito | |
| 5,628,453 A | 5/1997 | MacLaughlin | |
| 5,629,076 A | 5/1997 | Fukasawa | |
| 5,713,512 A | 2/1998 | Barrett | |
| 5,759,624 A | 6/1998 | Neale | |
| 5,765,710 A | 6/1998 | Bergerioux | |
| 5,766,709 A | 6/1998 | Geddes | |
| 5,769,311 A | 6/1998 | Morita | |
| 5,819,507 A | 10/1998 | Kaneko | |
| 5,840,139 A | 11/1998 | Geddes | |
| 5,866,053 A | 2/1999 | Park | |
| 5,868,309 A | 2/1999 | Sandstrom | |
| 5,895,614 A | 4/1999 | Rivera | |
| 5,925,450 A | 7/1999 | Karabedian | |
| 5,928,741 A | 7/1999 | Andersen | |
| 5,944,225 A | 8/1999 | Kawolics | |
| 5,948,839 A | 9/1999 | Chatterjee | |
| 6,007,437 A | 12/1999 | Schickert | |
| 6,010,062 A | 1/2000 | Shimono | |
| 6,030,476 A | 2/2000 | Geddes | |
| 6,034,144 A | 3/2000 | Shioya | |
| 6,051,174 A | 4/2000 | Park | |
| 6,071,580 A | 6/2000 | Bland | |
| 6,083,611 A | 7/2000 | Eichbauer | |
| 6,103,153 A | 8/2000 | Park | |
| 6,109,518 A | 8/2000 | Mueller | |
| 6,129,653 A | 10/2000 | Fredricks | |
| 6,136,396 A | 10/2000 | Gilmer | |
| 6,139,665 A | 10/2000 | Schmelzer | |
| 6,142,331 A | 11/2000 | Breining | |
| 6,169,122 B1 | 1/2001 | Blizard | |
| 6,174,930 B1 | 1/2001 | Agarwal | |
| 6,218,023 B1 | 4/2001 | DeNicola | |
| 6,231,942 B1 | 5/2001 | Blizard | |
| 6,235,380 B1 | 5/2001 | Tupil | |
| 6,251,319 B1 | 6/2001 | Tusim | |
| 6,257,485 B1 | 7/2001 | Sadlier et al. | |
| 6,258,862 B1 | 7/2001 | Matz | |
| 6,267,837 B1 | 7/2001 | Mitchell | |
| 6,284,810 B1 | 9/2001 | Burnham | |
| 6,294,115 B1 | 9/2001 | Blizard | |
| 6,306,973 B1 | 10/2001 | Takaoka | |
| 6,308,883 B1 | 10/2001 | Schmelzer | |
| 6,319,590 B1 | 11/2001 | Geddes | |
| 6,328,916 B1 | 12/2001 | Nishikawa | |
| 6,376,059 B1 | 4/2002 | Anderson | |
| 6,378,733 B1 | 4/2002 | Boonzaier | |
| 6,379,802 B2 | 4/2002 | Ito | |
| 6,383,425 B1 | 5/2002 | Wu | |
| 6,420,024 B1 | 7/2002 | Perez | |
| 6,444,073 B1 | 9/2002 | Reeves | |
| 6,455,150 B1 | 9/2002 | Sheppard | |
| 6,468,451 B1 | 10/2002 | Perez | |
| 6,472,473 B1 | 10/2002 | Ansems | |
| RE37,932 E | 12/2002 | Baldwin | |
| 6,512,019 B1 | 1/2003 | Agarwal | |
| 6,521,675 B1 | 2/2003 | Wu | |
| 6,541,105 B1 | 4/2003 | Park | |
| 6,562,447 B2 | 5/2003 | Wu | |
| 6,565,934 B1 | 5/2003 | Fredricks | |
| 6,586,532 B1 | 7/2003 | Gauthy | |
| 6,593,005 B2 | 7/2003 | Tau | |
| 6,593,384 B2 | 7/2003 | Anderson | |
| 6,613,811 B1 | 9/2003 | Pallaver | |
| 6,616,434 B1 | 9/2003 | Burnham | |
| 6,646,019 B2 | 11/2003 | Perez | |
| 6,649,666 B1 | 11/2003 | Read | |
| 6,713,139 B2 | 3/2004 | Usui | |
| 6,720,362 B1 | 4/2004 | Park | |
| 6,749,913 B2 | 6/2004 | Watanabe | |
| 6,779,662 B2 | 8/2004 | Dorsey | |
| 6,811,843 B2 | 11/2004 | DeBraal | |
| 6,814,253 B2 | 11/2004 | Wong | |
| 6,875,826 B1 | 4/2005 | Huovinen | |
| 6,883,677 B2 | 4/2005 | Goeking | |
| 6,884,377 B1 | 4/2005 | Burnham | |

(56) References Cited

U.S. PATENT DOCUMENTS

| | | |
|---|---|---|
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Herbert |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 8,715,449 B2 | 5/2014 | Leser |
| 8,721,823 B2 | 5/2014 | Vaideeswaran |
| 8,883,280 B2 | 11/2014 | Leser |
| 9,067,705 B2 | 6/2015 | Leser |
| 9,180,995 B2 | 11/2015 | Iyori |
| 9,358,772 B2 | 6/2016 | Leser |
| 2001/0010848 A1 | 8/2001 | Usui |
| 2001/0010849 A1 | 8/2001 | Blizard |
| 2001/0038893 A1 | 11/2001 | Mohan |
| 2001/0041236 A1 | 11/2001 | Usui |
| 2002/0030296 A1 | 3/2002 | Geddes |
| 2002/0041046 A1 | 4/2002 | Hartjes |
| 2002/0058126 A1 | 5/2002 | Kannankeril |
| 2002/0135088 A1 | 9/2002 | Harfmann |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1* | 1/2003 | Debraal ............... B29C 47/0021 |
| | | 428/34.2 |
| 2003/0029876 A1 | 2/2003 | Giraud |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1* | 1/2004 | Nonomura ................ B32B 1/02 |
| | | 428/34.2 |
| 2004/0031714 A1 | 2/2004 | Hanson |
| 2004/0038018 A1 | 2/2004 | Anderson |
| 2004/0062885 A1 | 4/2004 | Imanari |
| 2004/0115418 A1 | 6/2004 | Anderson |
| 2004/0170814 A1 | 9/2004 | VanHandel |
| 2005/0003122 A1 | 1/2005 | Debraal |
| 2005/0006449 A1 | 1/2005 | DAmato |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1* | 7/2005 | Yamamoto ........ A61F 13/15739 |
| | | 156/73.5 |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |

(56) References Cited

U.S. PATENT DOCUMENTS

| | | |
|---|---|---|
| 2006/0094577 A1* | 5/2006 | Mannlein ............ B31B 1/25 493/52 |
| 2006/0095151 A1 | 5/2006 | Mannlein |
| 2006/0108409 A1 | 5/2006 | Pyper |
| 2006/0135679 A1 | 6/2006 | Winowiecki |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | LiPiShan |
| 2008/0020162 A1 | 1/2008 | Fackler |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0311812 A1 | 12/2008 | Arriola |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0096130 A1 | 4/2009 | Jones |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0116422 A1 | 5/2010 | Vaideeswaran |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |
| 2015/0250342 A1 | 9/2015 | Euler |
| 2015/0258771 A1 | 9/2015 | Leser |

FOREIGN PATENT DOCUMENTS

| | | |
|---|---|---|
| CA | 2765489 | 12/2010 |
| CN | 1288427 | 3/2001 |
| CN | 1495100 | 5/2004 |

(56) References Cited

FOREIGN PATENT DOCUMENTS

| | | |
|---|---|---|
| CN | 1942370 | 4/2007 |
| CN | 101370873 | 2/2009 |
| CN | 101429309 | 5/2009 |
| CN | 101531260 | 9/2009 |
| CN | 101538387 | 9/2009 |
| CN | 102089370 | 6/2011 |
| CN | 102115561 | 7/2011 |
| CN | 102245368 | 11/2011 |
| CN | 102391570 | 3/2012 |
| CN | 102762350 | 10/2012 |
| CN | 102115561 | 2/2013 |
| DE | 2831240 | 1/1980 |
| DE | 2831240 C | 3/1988 |
| DE | 102006025612 | 11/2007 |
| DE | 102006025612 A1 | 11/2007 |
| EP | 0001791 | 5/1979 |
| EP | 0086869 | 8/1983 |
| EP | 0161597 | 11/1985 |
| EP | 0318167 | 5/1989 |
| EP | 0520028 | 12/1992 |
| EP | 0570221 | 11/1993 |
| EP | 0588321 | 3/1994 |
| EP | 0659647 | 6/1995 |
| EP | 0879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |
| EP | 2266894 | 12/2010 |
| EP | 2386584 A1 | 11/2011 |
| EP | 2386601 | 11/2011 |
| EP | 2720954 | 4/2014 |
| GB | 1078326 | 8/1967 |
| GB | 2485077 | 5/2012 |
| IT | WO 2007090845 A2 * | 8/2007 ............ B29C 45/72 |
| JP | 52123043 | 10/1977 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | H0543967 | 6/1993 |
| JP | 0615751 | 1/1994 |
| JP | 3140847 | 1/1994 |
| JP | 06192460 | 7/1994 |
| JP | P310847 | 12/2000 |
| JP | 2001310429 | 11/2001 |
| JP | 2003292663 | 10/2003 |
| JP | 2003321566 | 11/2003 |
| JP | 2004018101 | 1/2004 |
| JP | 2004168421 A | 6/2004 |
| JP | 2006130814 A | 5/2006 |
| JP | 2006142008 A | 6/2006 |
| JP | 2007154172 | 6/2007 |
| JP | 2008162700 | 7/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| KR | 100306320 | 10/2001 |
| KR | 2003036558 | 5/2003 |
| KR | 2004017234 | 2/2004 |
| KR | 101196666 | 11/2012 |
| WO | 9113933 | 9/1991 |
| WO | 9413460 | 6/1994 |
| WO | 9729150 | 8/1997 |
| WO | 9816575 | 4/1998 |
| WO | 0002800 | 1/2000 |
| WO | 0119733 | 3/2001 |
| WO | 0132758 | 5/2001 |
| WO | 0153079 | 7/2001 |
| WO | 0234824 | 5/2002 |
| WO | 03076497 | 9/2003 |
| WO | 03099913 | 12/2003 |
| WO | 2004168421 | 6/2004 |
| WO | 2004104075 | 12/2004 |
| WO | 2006042908 | 4/2006 |
| WO | 2006124369 | 11/2006 |
| WO | 2007003523 | 1/2007 |
| WO | 2007020074 | 2/2007 |
| WO | 2007068766 | 6/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 | 3/2011 |
| WO | 2011036272 A2 | 3/2011 |
| WO | 2011038081 | 3/2011 |
| WO | 2011076637 | 6/2011 |
| WO | 2011141044 | 11/2011 |
| WO | 2011144705 | 11/2011 |
| WO | 2012020106 | 2/2012 |
| WO | 2012025584 | 3/2012 |
| WO | 2012044730 | 4/2012 |
| WO | 2012055797 | 5/2012 |
| WO | 2012099682 | 7/2012 |
| WO | 2012173873 | 12/2012 |
| WO | 2012174422 | 12/2012 |
| WO | 2012174567 | 12/2012 |
| WO | 2012174568 | 12/2012 |
| WO | 2013032552 | 3/2013 |
| WO | 2013101301 | 7/2013 |

OTHER PUBLICATIONS

English summary of Chinese Office Action for Chinese Application Serial No. 201380065781.6, Apr. 19, 2016, 14 pages.

Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daployhmspp-extruded-foam/).

ASTM D3763-86, an American Society for Testing of Materials (ASTM), "Standard Method for High-Speed Puncture Properties of Plastics Using Load and Displacement Sensors" (1986 Edition), 5 pages.

ASTM D1922-93, an American Society for Testing of Materials (ASTM), "Standard Method for Propagation Tear Resistance of Plastic Film and Thin Sheeting by Pendulum Method" (1993 Edition), 5 pages.

Williams et al., "Thermal Connectivity of Plastic Foams", Polymer Engineering and Science, Apr. 1983, vol. 23, No. 6., 293-298.

Excerpts from M.C. McCrum et al., Principles of Polymer Engineering, 2nd ed., Oxford Science Publications (1997).

Martinez-Diez et al., "The Thermal Conductivity of a Polyethylene Foam Block Produced by a Compression Molding Process", Journal of Cellular Plastics, vol. 37 (2001), 21-42.

Borealis Product Brochure, Daploy HMS Polypropylene for Foam Extrusion (2010), 20 pages.

M. Antunes et al., "Heat Transfer in Polyolefin Foams," Heat Transfer in Multi-Phase Materials, A. Öchsner and G. E. Murch, Eds. Springer-Verlag Berlin Heidelberg, 2011, 131-161.

English Summary of Chinese Office Action for Application Serial No. 201380041896.1, dated Mar. 18, 2016, 7 pages.

(56) References Cited

OTHER PUBLICATIONS

Reichelt et al., "PP-Blends with Tailored Foamability and Mechanical Properties", Cellular Polymers, vol. 22, No. 5, 2003, 14 pages.
Ratzsch et al., "Radical reactions on polypropylene in the solid state", Prog. Polym. Sci. 27 (2002) 1195-1282, 88 pages.
Excerpts from Encyclopedia of Polymer Science and Technology: Plastics, Resins, Rubbers, and Fibers, "Blowing Agents", vol. 2, John Wiley & Sons, Inc. (1965), 37 pages.
Excerpts from Polymer Foams: Science and Technology, Lee et al., "Introduction to Polymeric Foams", CRC Press (2007) 51 pages.
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., "Applicability of the Transient Plane Source Method to Measure the Thermal Conductivity of Low-Density Polyethylene Foams", Journal of Polymer Science: Part B: Polymer Physics, vol. 42 (2004), 1226-1234.
The Burn Foundation, "Scald Burns", available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
"Power of a Microwave Oven", available at https://web.archive.org/web/20071010183358/ http://hypertextbook.com/facts/2007/TatyanaNektalova.shtml, dated Oct. 10, 2007, accessed on Feb. 5, 2016.
Health Physics Society, "Microwave Oven Q & A", available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., "Heat Transfer in Polypropylene-Based Foams ProducedUsing Different Foaming Processes", Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Excerpts from Robert H. Perry, Perry\s Chemical Engineers Handbook, 7th ed., The McGraw-Hill Companies, Inc. (1997).
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, Apr. 27, 2016, 5 pages.
Japanese Office Action for Japanese Patent Application No. 2014-528384, dated Mar. 1, 2016.
Doerpinghaus et al., "Separating the effects of sparse long-chain branching on rheology from those due to molecular weight in polyethylenes", Journal of Rheology, 47, 717 (2003).
English Summary of Chinese Office Action for Application Serial No. 201280051426.9, Apr. 29, 2016, 5 pages.
International Search Report and Written Opinion dated Oct. 18, 2013, relating to International Application No. PCT/US2013/053935.
Office Action dated Sep. 1, 2016 for U.S. Appl. No. 14/106,212.
Australian First Patent Examination Report for Application No. 2013359097 sent Aug. 26, 2016.
British Examamination Report for GB Application No. GB1400762.9, sent on Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2015, 7 pages.
Office Action dated Sep. 27, 2016 for U.S. Appl. No. 14/725,319.
Office Action for Chinese Patent Application No 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708 PCT/US2013/074923, dated Jul. 7, 2016.
English translation of Russian Office Action for Application Serial No. 2014101298, dated Jul. 22, 2016, 7 pages.
Australian First Patent Examination Report for Application No. 2012302251 dated Jul. 9, 2015.
Borealis AG, Daploy(TM) HMS Polypropylene for Foam Extrusion, 2010, 20 pages.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report and Written Opinion dated Sep. 17, 2013, relating to International Application No. PCT/US2012/041395.
International Search Report dated Feb. 26, 2013, relating to International Application No. PCT/US2012/043018.

(56) References Cited

OTHER PUBLICATIONS

International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 29, 2013, relating to International Application No. PCT/US2012/043016, 25 pages.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Notice of Allowance dated Apr. 6, 2015 for U.S. Appl. No. 13/526,417.
Notice of Allowance dated Jun. 23, 2014 for U.S. Appl. No. 13/491,327.
Notice of Allowance dated Oct. 6, 2014 for U.S. Appl. No. 13/491,327.
Office Action Chinese Patent Application No. 201280051426.9 dated Jul. 23, 2015.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 18, 2015 for U.S. Appl. No. 14/106,212.
Office Action dated Aug. 19, 2014 for Chinese Application No. 201280035667.4.
Office Action dated Aug. 21, 2014 for U.S. Appl. No. 13/526,454.
Office Action dated Aug. 27, 2015 for U.S. Appl. No. 14/106,358.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated May 19, 2015 for Chinese Application No. 201280035667.4.
Office Action dated Oct. 10, 2014 for U.S. Appl. No. 14/106,358.
Office Action dated Oct. 16, 2014 for U.S. Appl. No. 14/106,212.
Office Action dated Oct. 27, 2015 for U.S. Appl. No. 14/462,073.
Office Action dated Oct. 8, 2015 for U.S. Appl. No. 14/188,504.
Office Action dated Sep. 25, 2014 for U.S. Appl. No. 13/526,417.
Second Chinese Office Action dated Sep. 6, 2015 for Chinese Application Serial No. 201280034350.9.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP\s Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
Inter Partes Review Petition for U.S. Pat. No. 8,883,280 (712 pages) [Submitted in multiple parts].
Borealis webpage dated Jan. 20, 2010 from Internet Archive (6 pages).
Gibson and Ashby, Cellular solids: structure and properties, 2nd ed., Cambridge University Press (1997) (7 pages).
C. Maier and T. Calafut, Polypropylene: the Definitive User\s Guide and Databook, Plastics Design Library, William Andrew Inc. (1998) (19 pages).
Reichelt et al., Cellular Polymers, vol. 22, No. 5 (2003) (14 pages).
Ratzsch et al., Prog. Polym. Sci., 27 (2002), 1195-1282 (88 pages).
Encyclopedia of Polymer Science and Technology: Plastics, Resins, Rubbers, and Fibers, vol. 2, John Wiley & Sons, Inc. (1965) (37 pages).
Shau-Tarng Lee, Chul B. Park, and N.S. Ramesh, Polymer Foams: Science and Technology, CRC Press (2007) (51 pages).
Grant & Hackh\s Chemical Dictionary, 5th ed., McGraw-Hill, Inc. (1987) (3 pages).
Merriam-Webster\s Collegiate Dictionary, 11th ed. (2003), p. 70 (3 pages).
Merriam-Webster\s Collegiate Dictionary, 11th ed. (2003), p. 1237 (3 pages).
Hawley\s Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111 &JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly HMS Polypropylene for Foam Extrusion" obtained from Borealis webpage obtained from the Internet Archive\s "Wayback Machine" as of Nov. 16, 2008 (https://web.archive.org/web/20081116085125/ http://www.borealisgroup.com/pdf/literature/borealis-borouge/brochure/K_IN0020_GB_FF_2007_10_BB.pdf) ("Brochure \08" ) (20 pages).
Office Action dated Dec. 31, 2015 for U.S. Appl. No. 14/755,546.
Notice of Allowance dated Jan. 29, 2016 for U.S. Appl. No. 14/755,546.
English translation of First Office Action for Taiwanese Application No. 101121656, Nov. 13, 2015.
Singapore Notice of Eligibility for Grant, Search Report, and Examination Report transmitted Dec. 10, 2015 for Singapore Application No. 11201503336V.
Office Action dated Jan. 11, 2016 for U.S. Appl. No. 14/161,328.
English Summary of Russian Office Action for Application Serial No. 2014111340, dated Feb. 25, 2016, 8 pages.
United Kingdom Examination Report for Patent Application No. GB1400762.9 dated Feb. 11, 2016.
Office Action dated Feb. 16, 2016 for U.S. Appl. No. 14/108,142.

(56) References Cited

OTHER PUBLICATIONS

Extended European Search Report for European Application No. 13849152.7-1303 / 2912142 PCT/US2013/066811, dated Feb. 12, 2016.
English summary of Spanish Office Action for Application Serial No. P201490025, Feb. 9, 2016, 8 pages.
Supplemental European Search Report for European Application No. 12727994.1-1302, dated Feb. 17, 2016.
International Preliminary Report on Patentability dated Feb. 16, 2016, relating to International Application No. PCT/US2014/051508.
English Summary of Chinese Office Action for Application Serial No. 201380041896.1, dated Mar. 21, 7 pages.
Extended European Search Report for European Application No. 13827981.5-1708 / 2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Certified English translation of JP2003292663.
Australian Second Patent Examination Report for Application No. 2012302251, dated Feb. 26, 2016.
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/620,073.
Notice of Acceptance dated Jun. 10, 2016 for Australian Application No. 2012302251.
English translation of Japanese Office Action for Japanese Application No. 2014-516089, dated May 10, 2016.
Third Party Submission Under 37 CFR 1.290 filed May 12, 2016 in U.S. Appl. No. 14/739,510.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Rolypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529 received on Nov. 14, 2016, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 received Dec. 23, 2016, 5 pages.
Japanese Office Action for Japanese Patent App. 2014-516089 sent Dec. 20, 2016, 6 pages.
European Examination Report for European App. No. 12727994.1 received on Jan. 25, 2016, 4 pages.
Japanese Office Action for Japanese App. No. 2014-528384 received Dec. 6, 2016, 15 pages.
Singapore Office Action and Written Opinion received Feb. 6, 2017 for Singapore Applicaion No. 11201504333U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Offfice Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 mailed Feb. 28, 2017, 16 pages.
New Zealand First Examination Report for New Zealand Application 708546 received Feb. 23, 2014, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, 11 pages.
New Zealand Examination Report for New Zealanc Application No. 708463 received Mar. 16, 2017, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 mailed Feb. 23, 2017, 6 pages.
Taiwan Office Action for Taiwan Pat. App. No. 102146299 received on Oct. 21, 2016, 7 pages.
Third Party Observation filed in European Patent App. No. 12727994.1 received on Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 received Oct. 12, 2016, 4 pages.
British Examination Report for GB App. No. 1400762.9 received Oct. 12, 2016, 2 pages.
Chinese Office Action for Chinese Applicaiton 201380065781.6 received Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009.
Extended European Search Report for European App. No. 13863649.3 received Sep. 27, 2016, 9 pages.
Chinese Office Action for Chinese Application No. 201280051426.9 received Nov. 1, 2016, 9 pages.
English Summary of Chinese Office Action for Application Serial No. 201380041896.1, dated Nov. 11, 2016, 11 pages.

(56) References Cited

OTHER PUBLICATIONS

Extended European Search Report for European App. No. 14775300.8 sent Oct. 24, 2016, 9 pages.
Office Action dated Nov. 18, 2016 for U.S. Appl. No. 14/718,836.
Office Action dated Oct. 7, 2016 for U.S. Appl. No. 14/739,510.
Japanese Office Action for Japanese Application No. 2014-515882, dispatched Aug. 30, 2016, 6 pages.
Mexican Office Action for Mexican Application MX/a/2013/014993 received on Sep. 27, 2016, 6 pages.
New Zealand Examination Report for New Zealanc Application No. 708463 received Oct. 3, 2016, 3 pages.
New Zealand Examination Report for New Zealand Application No. 708552 received on Oct. 7, 2016, 4 pages.
New Zealand First Examination Report for New Zealand Application 708546 received Sep. 26, 2016, 4 pages.
Russian Office Action for Russian Application No. 2014101298 received Sep. 30, 2016, 6 pages.
European Examination Report for European App. No. 12727994.1 received on Sep. 23, 2016, 4 pages.
Chinese Office Action for Chinese App. No. 201380065089.3 received Sep. 30, 2016, 12 pages.
Chinese Office Action for Chinese App. No. 201380065127.5 received Jul. 26, 2016, 11 pages.
European Search Report for European App. No. 13849152.7 received Sep. 16, 2016, 3 pages.
Australian Patent Examination Report for Australian App. No. 2013334155 issued on Oct. 24, 2016, 7 pages.
Notice of Allowability dated Oct. 26, 2016 for U.S. Appl. No. 14/106,358.
Office Action dated Apr. 7, 2017 for U.S. Appl. No. 14/063,252.
Chinese Office Action for Chinese Application No. 201380065127.5 sent on Apr. 1, 2017, 14 pages.
Japanese Office Action for Japanese Application No. 2014-515882, dispatched Apr. 4, 2017, 6 pages.
New Zealand Examination Report for New Zealand Application No. 708552 received on Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 mailed Apr. 5, 2017, 12 pages.
Chinese Office Action for Chinese App. No. 201380065089.3 received Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.

\* cited by examiner

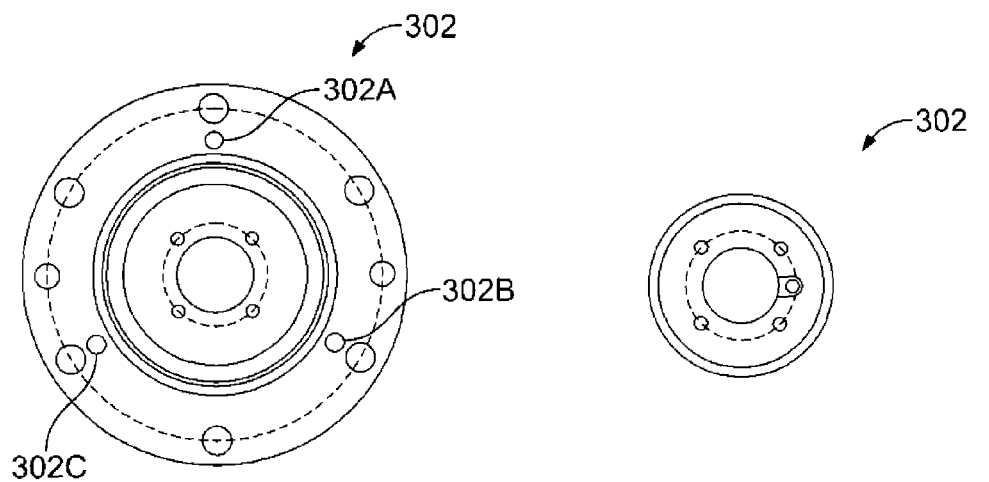
FIG. 10    FIG. 11
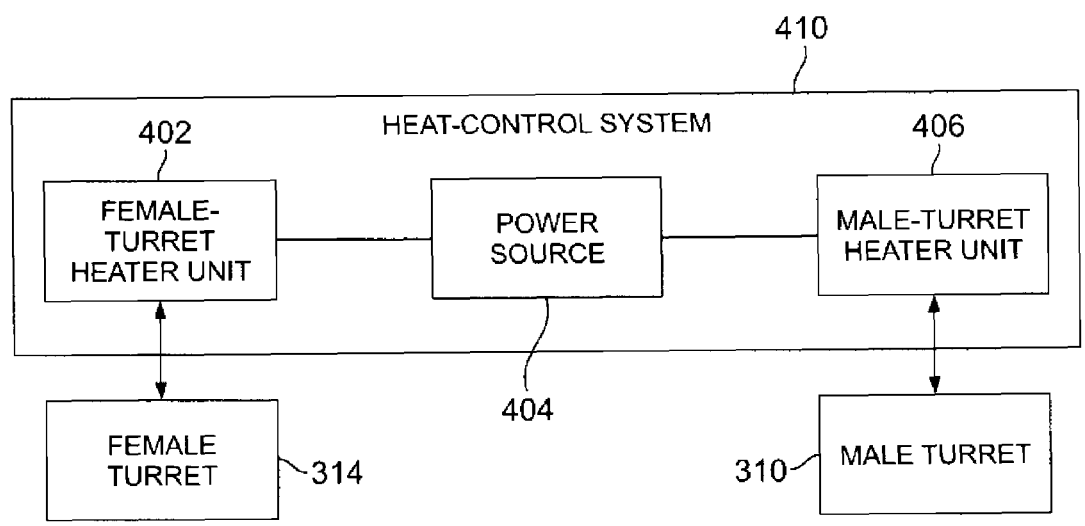
FIG. 12

CUP-FORMING PROCESS AND MACHINE

RELATED APPLICATIONS

This application claims priority under 35 U.S.C. §119(e) to U.S. Provisional Application No. 61/737,236, filed Dec. 14, 2012 and U.S. Provisional Application No. 61/680,568, filed Aug. 7, 2012, both of which are expressly incorporated by reference herein.

BACKGROUND

The present disclosure relates to a machine for forming cups, and in particular to insulated cups. More particularly, the present disclosure relates to a cup-forming machine that uses a body blank and a floor blank to form an insulated cup.

SUMMARY

A cup-making process in accordance with the present disclosure produces an insulated cup using a cup-forming machine. The cup-making process includes the operations of forming a body of the insulated cup and forming a brim on the body to establish the insulated cup. The body-forming operation uses a body blank and a floor blank to establish the body. The brim-forming operation uses the body formed during the body-forming operation and curls a top edge of the body out and down to establish a rolled brim on the body so that an insulated cup is established.

In illustrative embodiments, a cup-making process in accordance with the present disclosure makes an insulative cup from a body blank and a floor blank. Both the floor blank and the body blank are made from a sheet of insulative cellular non-aromatic polymeric material The cup-making process further includes a heating operation in which heat is transferred to the body blank to reduce stress in the body blank during wrapping of the body blank around a heated male mandrel included in the cup-forming machine to cause the body of the insulative cup to have a substantially round cross section so that formation of out-of-round cups is minimized and formation of visible imperfections in the body of the insulative cup are minimized.

In illustrative embodiments, the cup-making process further includes a warming operation in which heat is transferred to the body to reduce stress in the body after the body-forming operation is complete and during curling of the top edge of the body during the brim-forming operation. As a result of transferring heat from a heated female receiver included in the cup-forming machine to the body, stress imparted to the body during the body-forming operation is relieved and so that formation of visible imperfections in the insulative cup remain minimized and a substantially even rolled brim is established.

In illustrative embodiments, the cup-forming machine includes a male turret, a female turret, and a heat-control system. The male turret includes a plurality of male mandrels heated by mandrel heaters included in the heat-control system. Each heated male mandrel is adapted to form a cup body using the body blank during the body-forming operation of the cup-forming process so that visible imperfections in the insulative cup are minimized. The female turret includes a plurality of female receivers heated by receiver heaters included in the heat-control system. Each heated female receiver is configured to receive a cup body from a male mandrel and to form a rolled brim on the cup body during the brim-forming operation.

In illustrative embodiments, the heat-control system of the cup-forming machine is configured to maintain the heated male mandrels at a temperature of about 150 degrees Fahrenheit to about 250 degrees Fahrenheit. The heat-control system of the cup-forming machine is further configured to maintain the heated female receivers at a temperature of about 100 degrees Fahrenheit to about 250 degrees Fahrenheit.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of a cup-forming process in accordance with the present disclosure showing that the cup-forming process includes the operations of staging materials for use in a cup-forming machine, heating male mandrels included in the cup-forming machine, forming a body, heating female receivers formed in the cup-forming machine, and forming a brim to establish an insulative cup in accordance with the present disclosure;

FIG. 2 is a diagrammatic view of the staging materials operation showing that the staging-materials operation includes the operations of loading body blanks onto the cup-forming machine, placing body blanks on a loading turret, and heating the body blanks and loading a laminated roll of material onto the cup-forming machine and cutting floor blanks from the laminated roll;

FIG. 3 is a diagrammatic view of the body-forming operation showing that the body-forming operation includes the operations of forming a platform-support member from the floor blank, inserting the floor into a floor-receiving space formed in the male mandrel, folding the body blank around the male mandrel, joining an outer tab and an inner tab included in the body blank together to form a side wall, wrapping a floor-retaining flange around the platform support member, and bonding the floor-retaining flange to the platform support member to form a body;

FIG. 10 is another elevation view of the male mandrel of FIGS. 8 and 9 showing a proximal end of the male mandrel having a first diameter;

FIG. 11 is another elevation view of the male mandrel of FIGS. 8-10 showing a distal end of the male mandrel having a relatively smaller diameter;

FIGS. 12-14 are a series of view showing a heat-control system included in the cup-forming machine;

Figure 5:
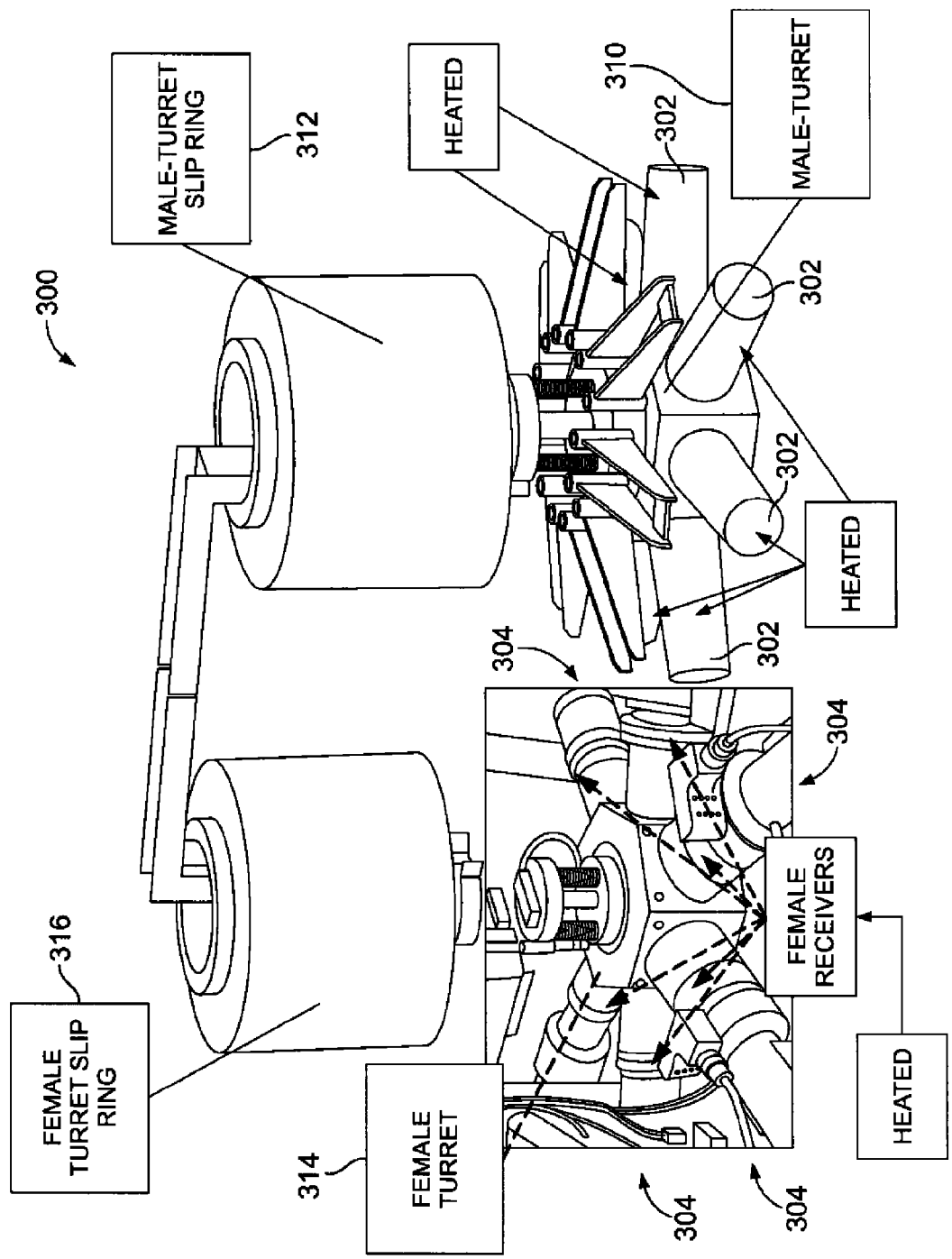
FIG. 5 is a diagrammatic and perspective view of a portion of a cup-forming machine in accordance with the present disclosure showing that the cup-forming machine includes a male turret including heated male mandrels that are supplied power by a male-turret slip ring and a female turret including heated female receivers that are provided power from a female-turret slip ring.
Figure 13:
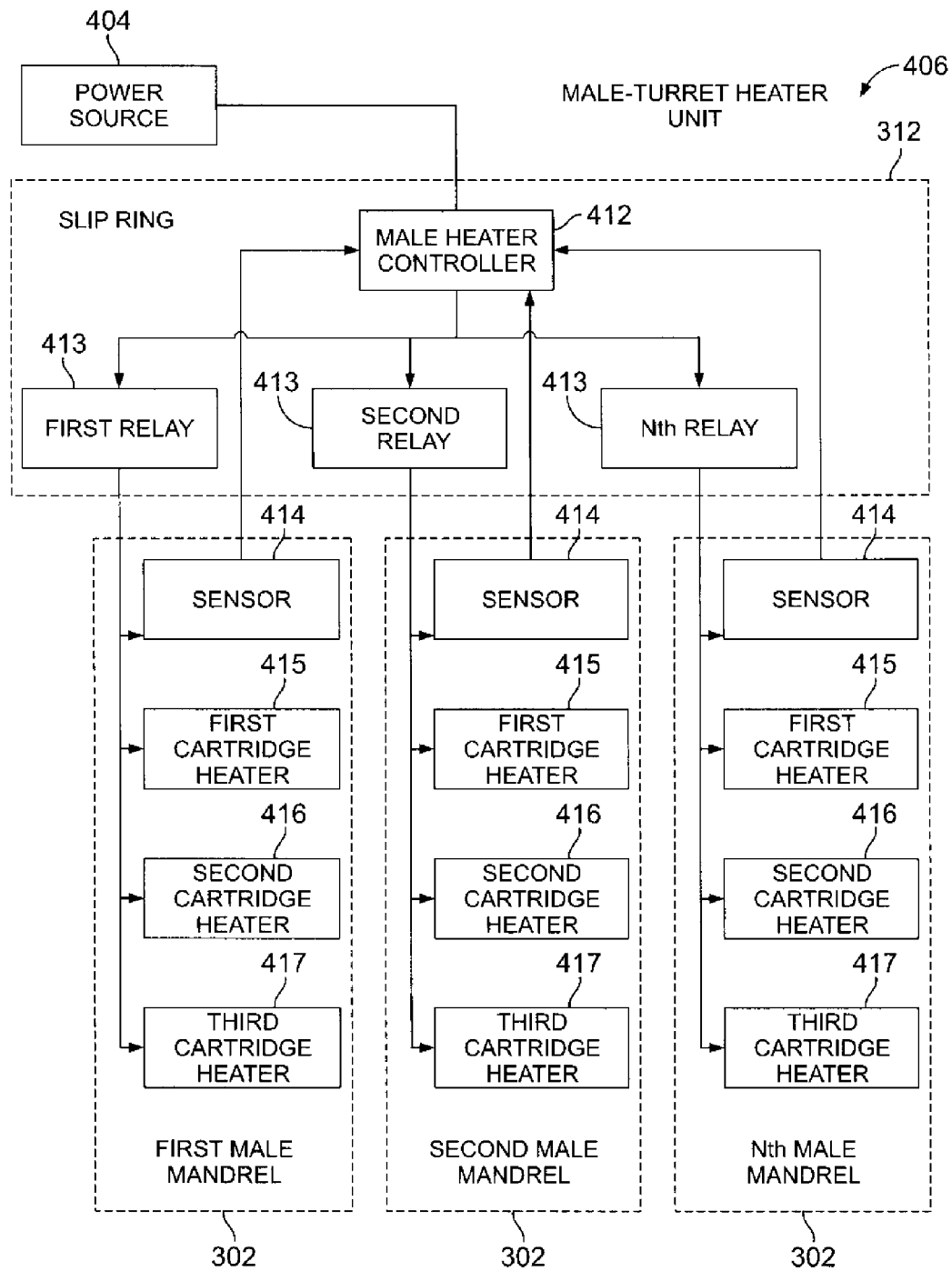
Figure 14:
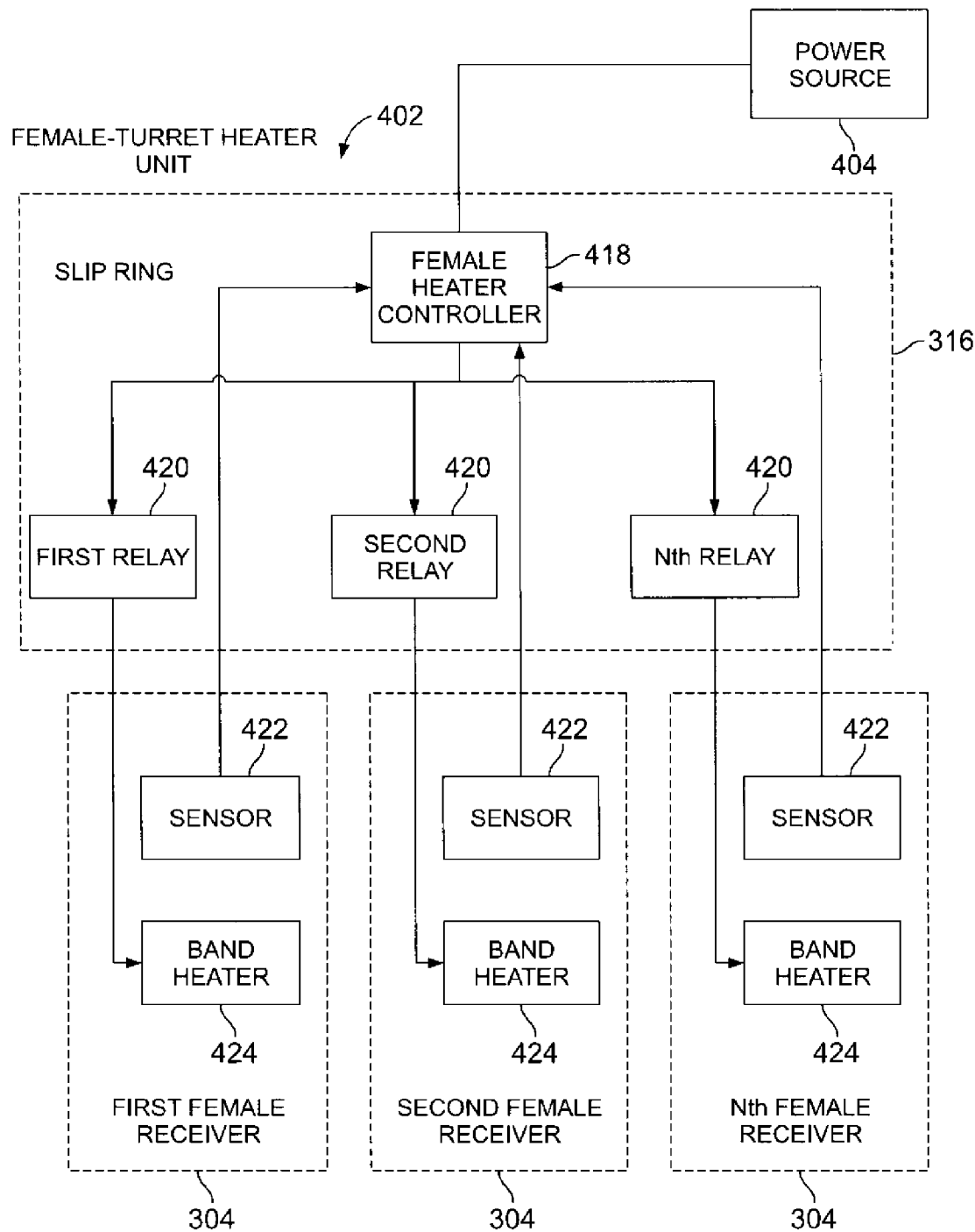
Figures 15, 16:
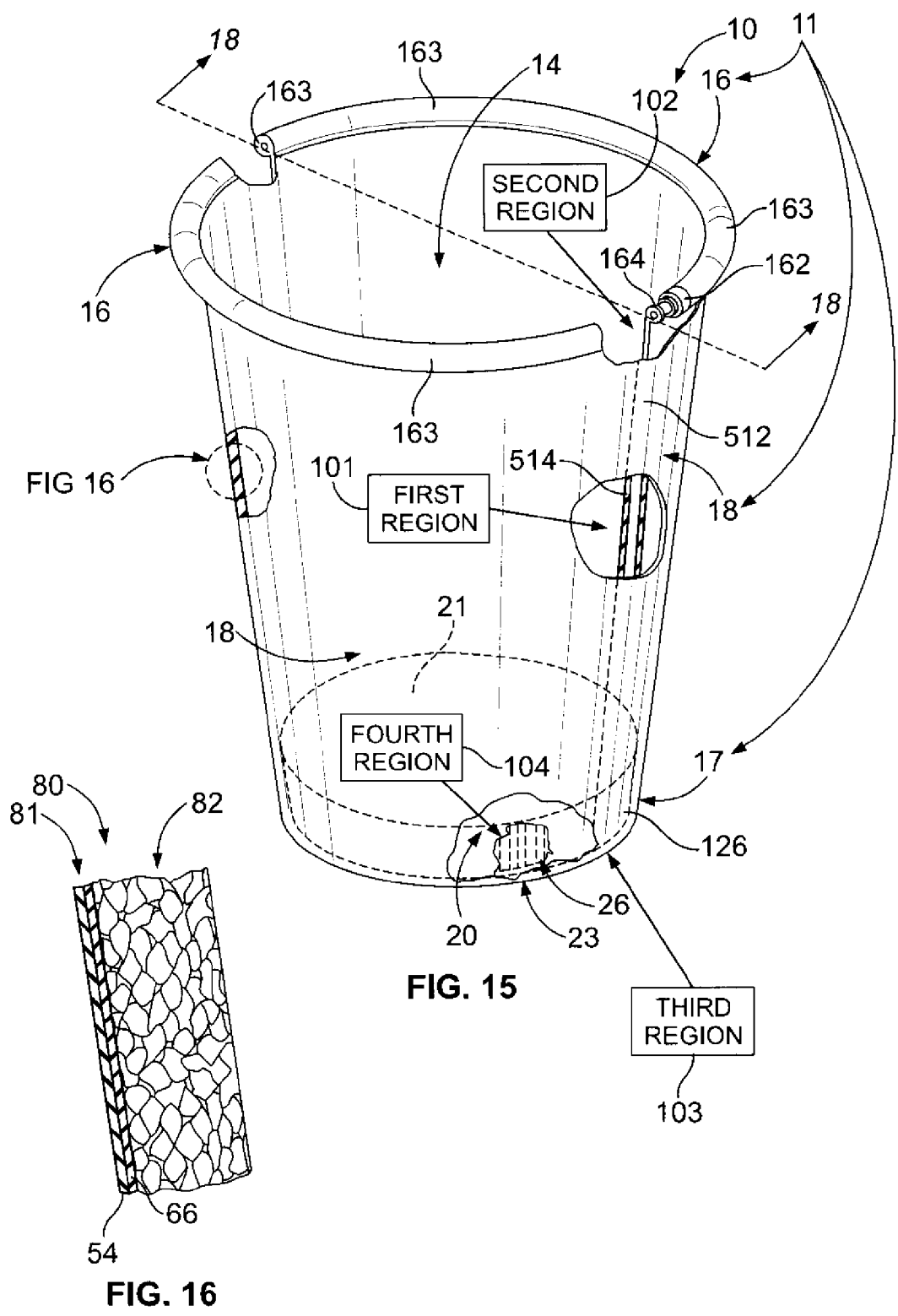
Figure 17:
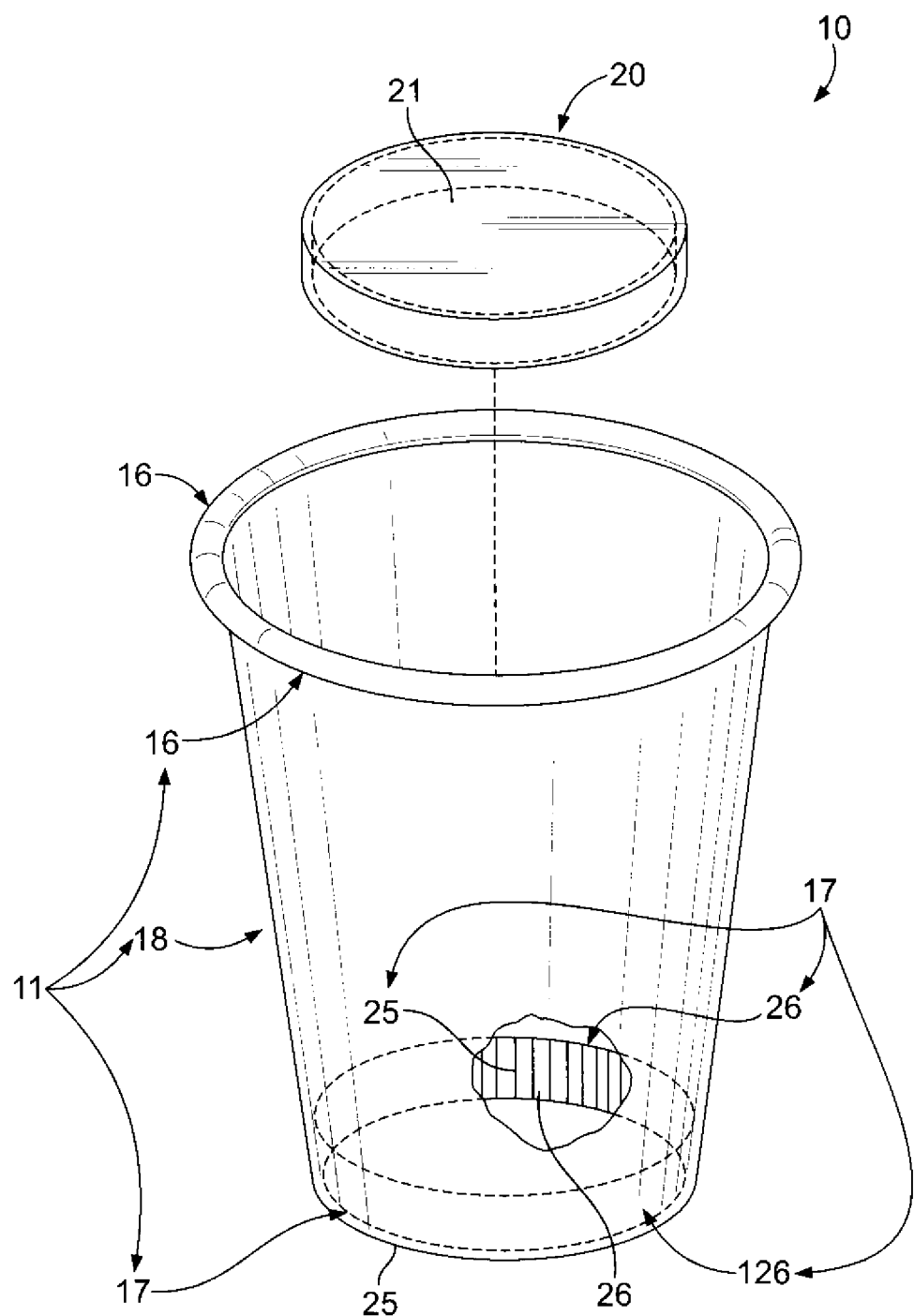
Figure 18:
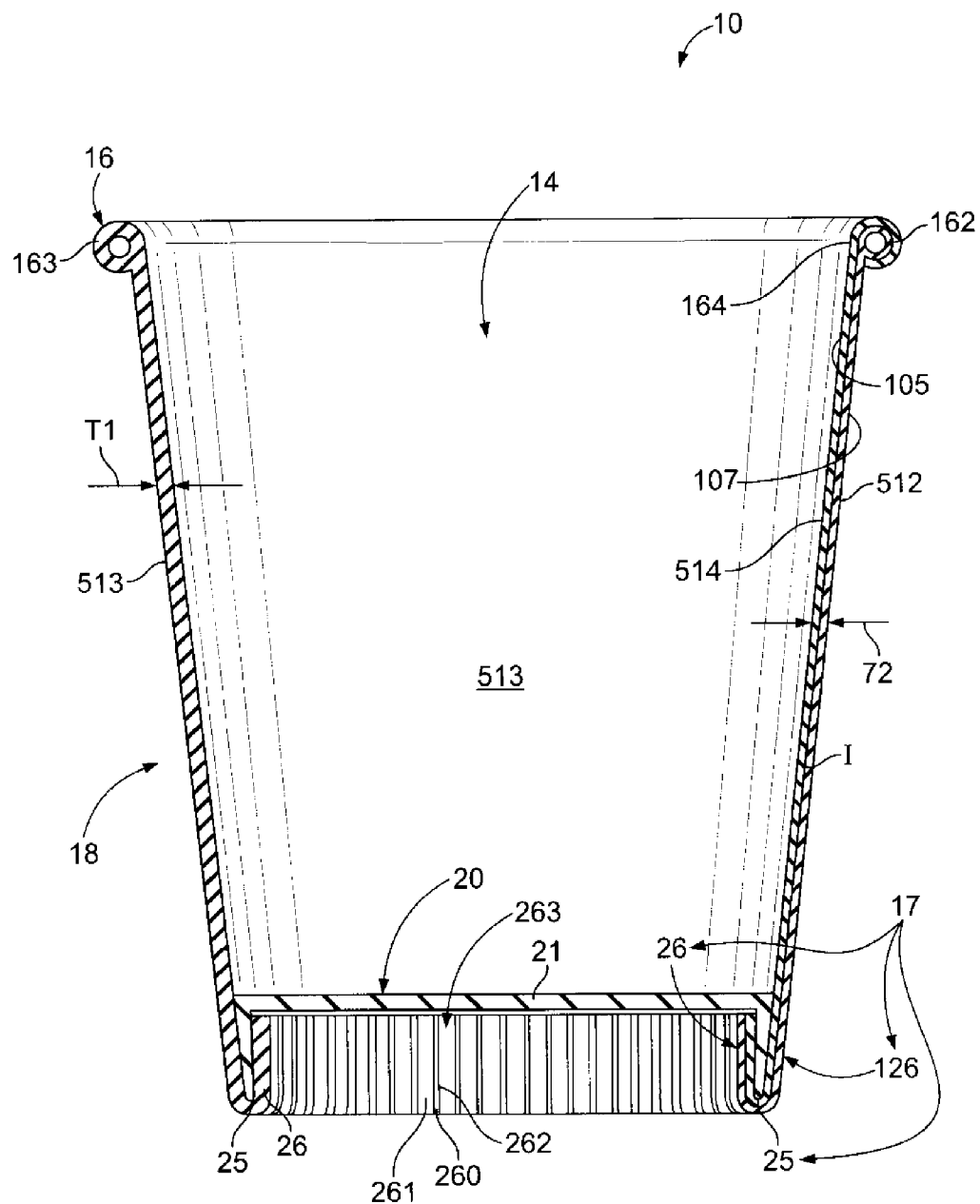

FIG. 12 is a diagrammatic view of a heat-control system included in the cup-forming machine of FIG. 5 showing that the heat-control system includes, from left to right, a female turret-heater unit that heats the female receivers included in the female turret, a power source providing power to both turret-heater units, and a male turret-heater unit that heats the male mandrels included in the male turret;

FIG. 13 is a diagrammatic view of the male turret-heater unit showing that the male turret-heater unit includes, from top to bottom, a male heater controller, first, second, and Nth relays, a sensor coupled to each male mandrel, and first, second, and third cartridge heaters coupled to each male mandrel;

FIG. 14 is a diagrammatic view of the female turret-heater unit showing that the female turret-heater unit includes, from top to bottom, a female heater controller, first, second, and Nth relays, a sensor coupled to each female receiver, and a band heater coupled to each female receiver;

FIG. 15 is a perspective view of an insulative cup made from an insulative cellular non-aromatic polymeric material using the cup-forming process shown in FIGS. 1-4 showing that the insulative cup includes a body and a floor;

FIG. 16 is an enlarged sectional view of a portion of a side wall included in the body of the insulative cup of FIG. 15 showing that the side wall is made from the sheet that includes, from left to right, a skin including a film layer, an ink layer, and an adhesive layer, and the strip of insulative cellular non-aromatic polymeric material;

FIG. 17 is an exploded assembly view of the insulative cup of FIG. 15 showing that the insulative cup includes, from top to bottom, the floor and the body including a rolled brim, the side wall, and a floor mount configured to interconnect the floor and the side wall as shown in FIG. 15; and FIG. 18 is a sectional view taken along line 18-18 of FIG. 15 showing that the side wall included in the body of the insulative cup includes a generally uniform thickness and that the floor is coupled to the floor mount included in the body.

DETAILED DESCRIPTION

Figure 1:
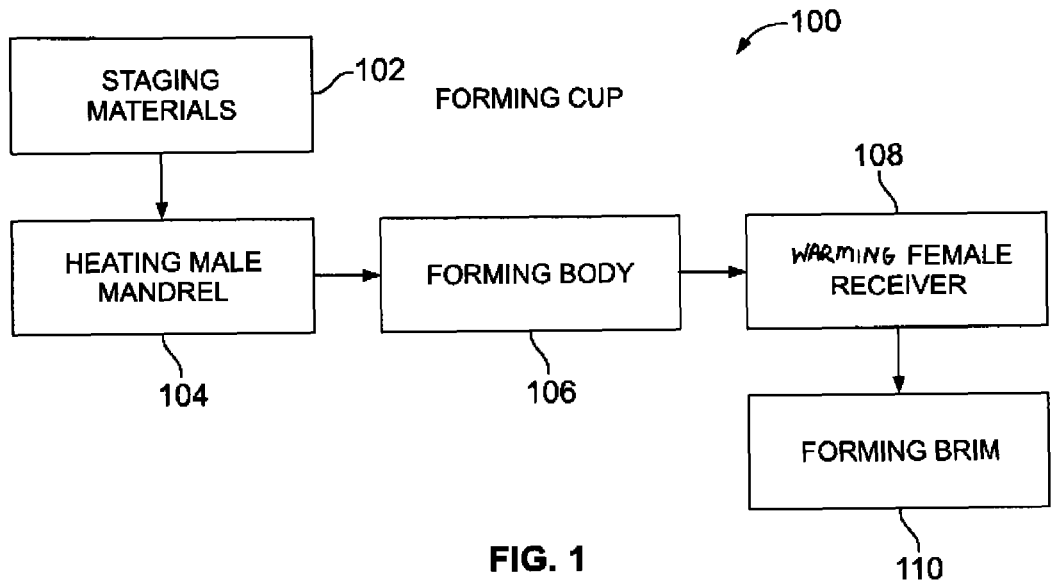

A cup-forming process 100 in accordance with the present disclosure includes a staging materials operation 102, a heating male mandrels operation 104, a forming a body operation 106, a heating female receivers operation 108, and a forming a brim operation 110 as shown in FIG. 1. Staging materials operation 102 stages material for use by a cup-forming machine 300. Heating male mandrels operation 104 heats male mandrels 302 included in cup-forming machine 300 to produce heated male mandrels 302. Forming a body operation 106 forms a body 11 using heated male mandrels 302. Heating female receivers operation 108 heats female receivers 304 included in cup-forming machine 300 to establish heated female receivers 304. Forming a brim operation 110 forms a rolled brim 16 on body 11 using heated female receives 304 to establish an insulative cup 10 as shown in FIGS. 15, 17, and 18. Insulative cup 10 disclosed herein is not a paper cup but rather a cup made of a cellular non-aromatic polymeric material with insulative qualities suitable for holding hot and cold contents.

Figure 2:
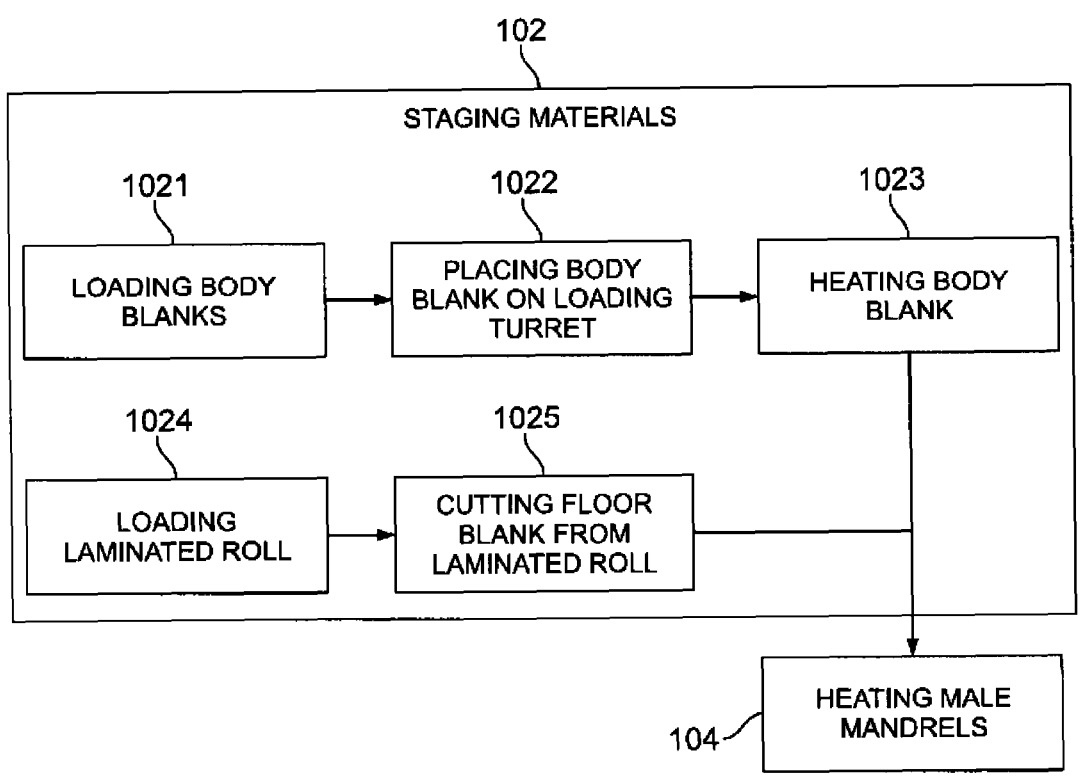

Staging materials operation 102 includes a loading body blanks operation 1021, a placing body blanks operation 1022, a heating body blanks operation 1023, a loading laminated roll operation 1024, and a cutting floor blank operation 1025 as shown in FIG. 2. Loading body blanks operation 1021 provides a body blank to cup-forming machine 300. Placing body blanks operation 1022 then places the body blank on a loading turret which rotates at the same rate as an associated male turret 310 included in cup-forming machine 300. Heating body blanks operation 1023 then applies heat to each body blank. During loading body blanks operation 1021, loading laminated roll operation 1024 occurs in which a laminated roll of material is loaded onto cup-forming machine 300. Cutting floor blank operation 1025 then cuts a floor blank from the laminated roll that is mated with the body blank during subsequent forming a body operation 106 as shown in FIG. 3.

During staging materials operation 102, each male mandrel 302 is heated by a male turret-heater unit 406 in heating male mandrels operation 104 as suggested in FIG. 12. As an example, each male mandrel 302 is heated to about 200 degrees Fahrenheit (° F.) with a tolerance of +/− about 50 degrees. Heating male mandrels and thereby the body blank during forming a body operation 106 facilitates providing an interior surface of insulative cup 10 that is round. Heating male mandrels also minimizes waste as a result of forming out-of-round cups. An out-of-round cup is a cup which does not have a substantially circular shape in a horizontal reference plane that is orthogonal to a central vertical axis extending through and in orthogonal relation to a floor of insulative cup 10.

When male mandrels are heated in heating male mandrels operation 104, forming a body operation 106 then proceeds. Forming a body operation 106 includes a forming a platform-support member operation 1061, an inserting the floor operation 1062, a folding body blank operation 1063, a joining operation 1064, a wrapping operation 1065, and a bonding operation 1066 as shown in FIG. 3. Forming a platform-support member operation 1061 forms a platform-support member 23 as shown in FIG. 17. Inserting the floor operation 1062 then inserts floor 20 into a floor-receiving space formed in each male mandrel 302. Folding body blank operation 1063 then folds the body blank around male mandrel 302. Joining operation 1064 then joins an outer tab 512 and an inner tab 514 included in the body blank together to form a side wall 18 as shown in FIG. 17. Wrapping operation 1065 wraps a floor-retaining flange 26 around platform-support member 23. Bonding operation 1066 couples floor-retaining flange 26 to platform-support member 23 to form a body 11.

Figure 3:
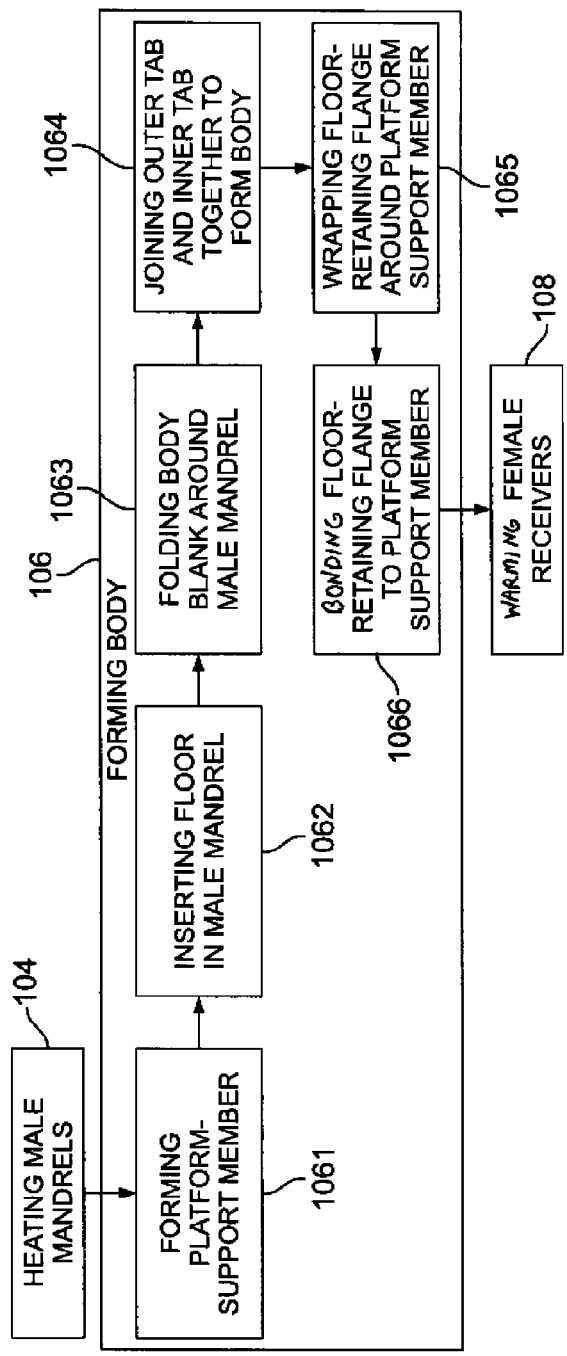

During forming a body operation 106, each female receiver 304 is heated or warmed by an associated female turret-heater unit 402 to produce heated female receivers 304 in heating female receivers operation 108, also called warming female receivers operation 108, as shown in FIG. 3 and suggested in FIG. 12. As an example, each female receiver 304 is warmed to about 175 degrees Fahrenheit with a tolerance of +/− of about 75 degrees. In another example, each female receiver is warmed to about 140 degrees Fahrenheit. Warming female receivers minimizes deformation of body 11 during forming a brim operation 110 maintaining the interior surface of insulative cup 10 that minimizes creasing. Warming female receivers also minimizes waste as a result of forming out-of-round cups.

Figure 4:
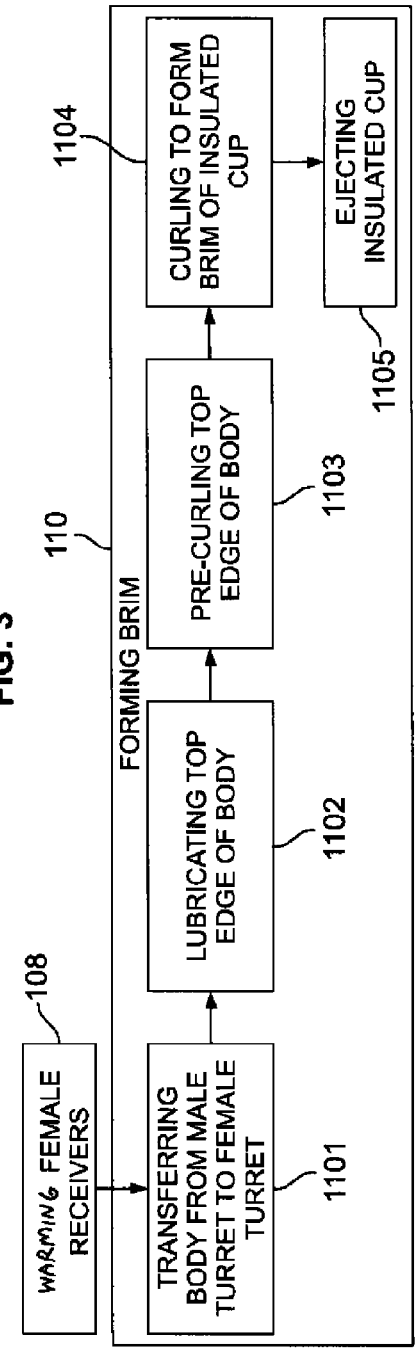
FIG. 4 is a diagrammatic view of the brim-forming operation showing that the brim-forming operation includes the operations of transferring the body from the male mandrel to a female receiver, lubricating a top edge of the body, pre-curling the top edge of the body, and curling the top edge to form a rolled brim included in the insulative cup, and ejecting the insulative cup.

When female receivers are warmed in warming female receivers operation 108, forming a brim operation 110 then proceeds. Forming a brim operation 110 includes a transferring operation 1101, a lubrication operation 1102, a pre-curling operation 1103, a curling operation 1104, and an ejecting operation 1105 as shown in FIG. 4. Transferring operation 1101 transfers body 11 from male mandrel 302 to female receiver 304. Lubrication operation 1102 applies a food-grade lubricant to a top edge of body 11 and seats body 11 in female receiver 304. Pre-curling operation 1103 pre-curls the top edge of body 11 to provide a more uniform final brim 16. Curling operation 1104 rolls top edge to form rolled brim 16 and create insulative cup 10. Ejecting operation 1105 ejects insulative cup 10 from cup-forming machine 300 for storage, transportation, or further processing.

Figure 7:
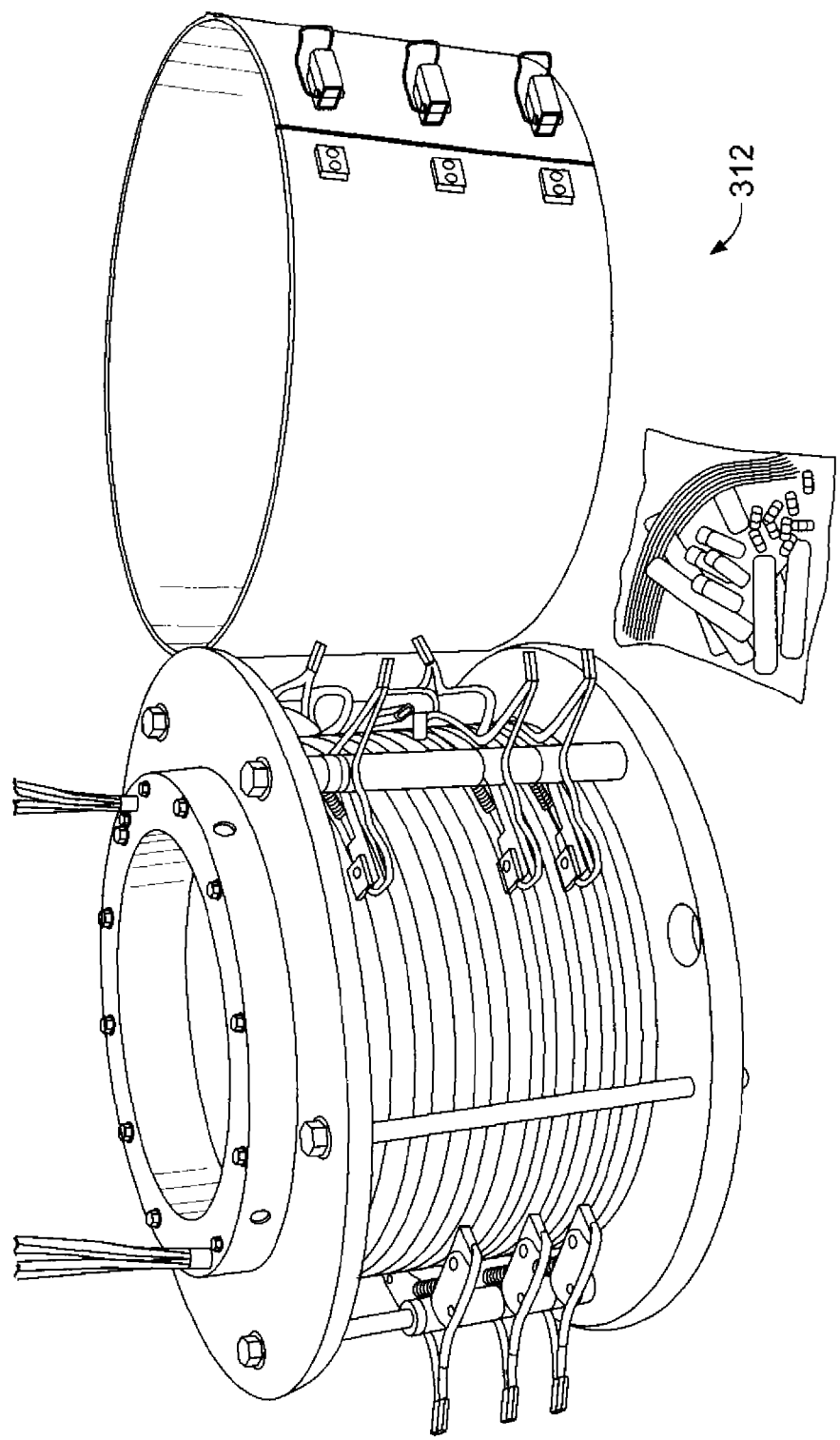
FIG. 7 is a perspective view of the male-turret slip ring of FIG. 6 disassembled and removed from the male turret.

A portion of cup-forming machine 300 is shown, for example in FIG. 5. Cup-forming machine 300 comprises a male turret 310, a male-turret slip ring 312, a female turret 314, and a female-turret slip ring 316 as shown in FIG. 5. Male-turret slip ring 312 provides a constant electrical connection between heaters and sensors coupled to male mandrels 302 of male turret 310 without causing binding or breaking of electrical wires. Female-turret slip ring 316 also provides an electrical connection between heaters and sensor coupled to female receivers 304 of female turret 314 as suggested in FIG. 5 and shown in FIG. 7.

Figure 6:
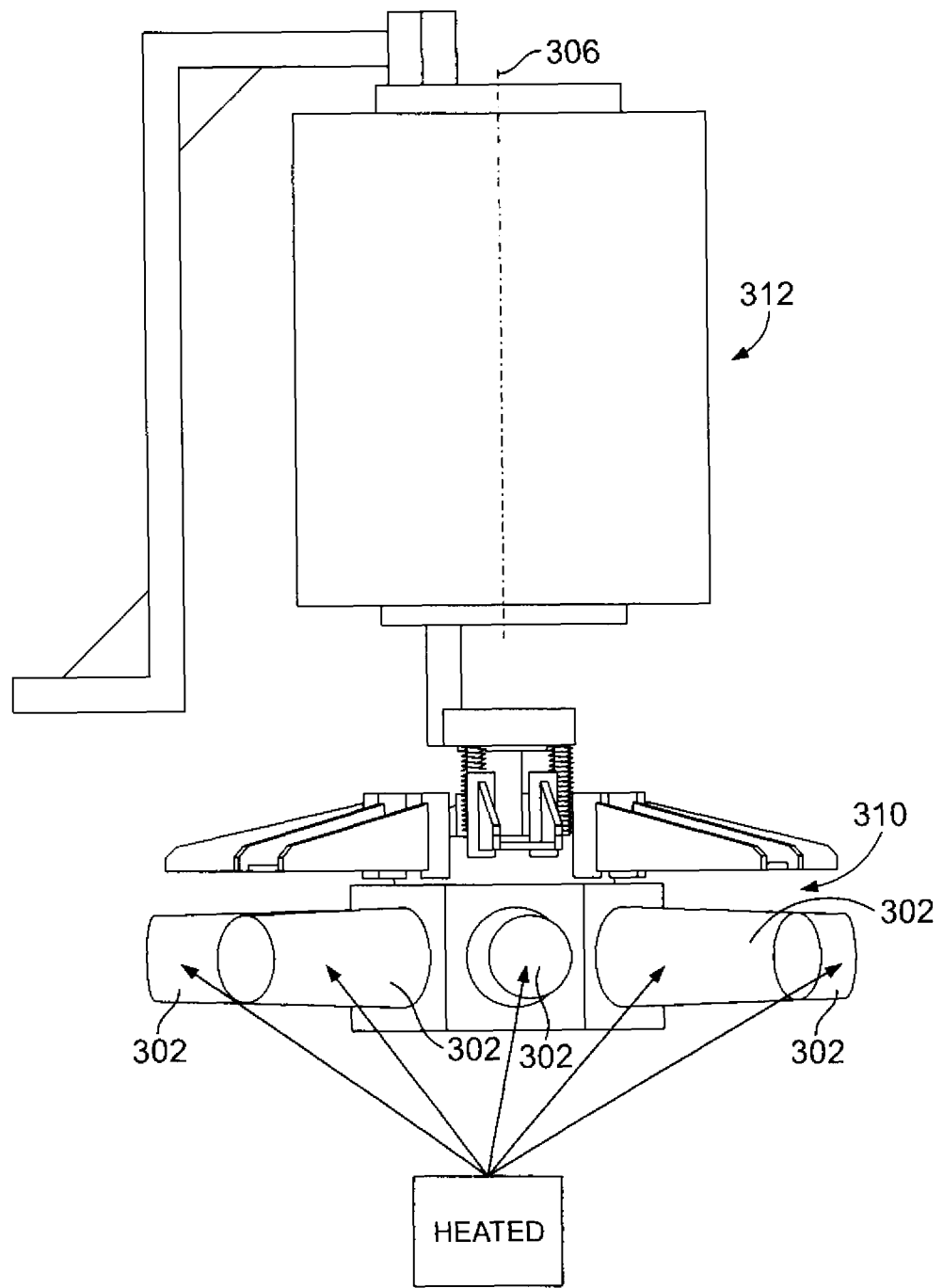
FIG. 6 is an elevation view of the male turret and male-turret slip ring of FIG. 5.

Male turret 310 includes, for example, a series of equally spaced apart male mandrels 302 as shown in FIGS. 5 and 6. Male turret 310 rotates about a male-turret axis 306 as shown in FIG. 6 to advance a body 11 through each operation of the process. While male turret 310 is shown with seven male mandrels 302, the number of male turrets may be increased or decreased according to machine speed desired and various other factors.

Female turret 314 includes, for example, a series of equally spaced apart female receivers 304 as suggested in FIG. 5. Female turret 314 rotates about a female-turret axis to advance body 11 through each operation of forming a brim operation 110. Female turret 314 generally has the same number of female receivers 304 as male turret 310 has male mandrels 302.

Figure 8:
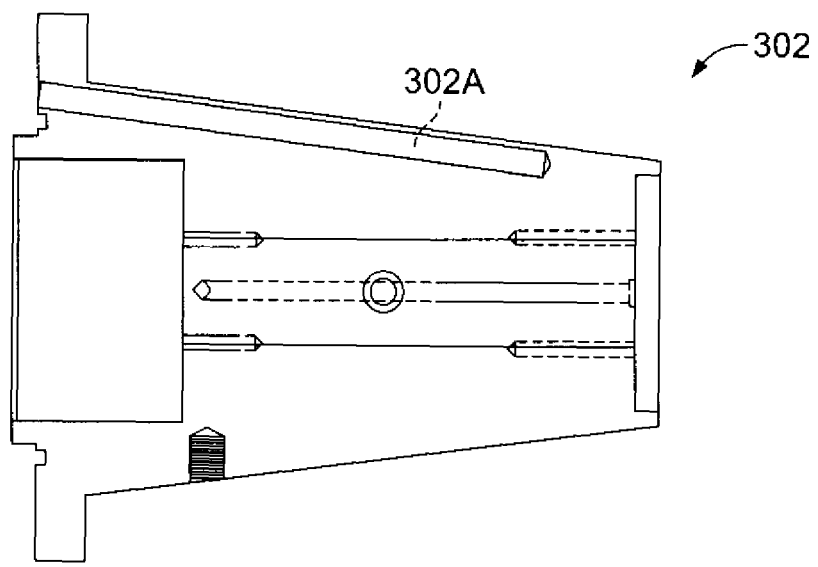
FIG. 8 is a side elevation view of a male mandrel included in the male turret of FIGS. 5 and 6 showing one of three bores that are formed in the male mandrel such that each bore receives a cartridge heater therein as suggested in FIG. 13.

Each male mandrel 302 is substantially the same as every other male mandrel. Male mandrel 302 is formed to include three bores 302A, 302B, and 302C as suggested in FIG. 8 and shown in FIG. 9. Each bore 302A, 302B, 302C is sized to receive and retain an associated cartridge heater therein. Each cartridge heater is coupled to male-turret slip ring 312 to receive power as suggested in FIG. 7.

Figure 9:
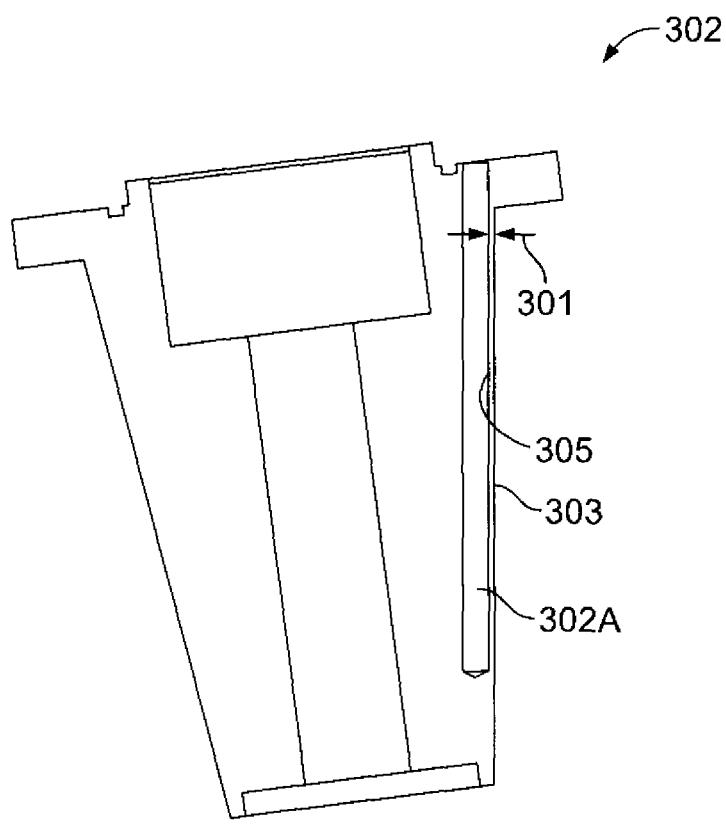
FIG. 9 is another side elevation view showing a wall thickness between an outer surface of the male mandrel and the inner surface of the bore.

A thickness 301 is established between an outer surface 303 of male mandrel 302 and an inner surface 305 of each bore 302A, 302B, 302C as suggested in FIG. 9. As an example, thickness 301 is about 0.080 inches and generally constant along a length of male mandrel 302. In addition, bores 302A, 302B, 302C are spaced apart equally from one another an equal distance and arranged to form a generally triangular shape. Each bore 302A, 302B, 302C forms an apex of the triangular shape and the triangular shape is generally an equilateral triangle.

An insulative gasket may be positioned between each male mandrel 302 and a support structure included in male turret 310. An example, the insulative gasket may be made of mica, ceramic, or the like and configured to minimize transfer of heat from male mandrel 302 to the support structure and other components included in cup-forming machine 300.

Cup-forming machine 300 further includes a heat-control system 410 as shown, for example, in FIG. 12. Heat-control system 410 controls the temperature of each male mandrel 302 so that a target temperature of about 200 degrees Fahrenheit is maintained within a tolerance of +/− about 50 degrees, and controls the temperature of each female receiver 304 so that a target temperature of about 175 degrees Fahrenheit is maintained within a tolerance of +/− about 75 degrees. As shown in FIG. 12, heat-control system 410 includes a female turret-heater unit 402, a power source 404, and a male turret-heater unit 406. Female turret-heater unit 402 provides heat and controls the temperature of each female receiver 304. Male turret-heater unit 406 provides heat and controls the temperature of each male mandrel 302 as suggested in FIG. 12.

Male turret-heater unit 406 includes a male heater controller 412 and a mandrel heater associated with each male mandrel 302. As shown in FIG. 13, only three mandrel heaters are shown. As an example, the first mandrel heater is associated with first male mandrel 302. First mandrel heater includes a first relay 413, a sensor 414, and first, second, and third cartridge heaters 415, 416, 417 as shown in FIG. 13. First relay 413 is coupled to male heater controller 412 and configured to provide power selectively to first, second, and third cartridge heaters 415, 416, 417 as shown in FIG. 13. Sensor 414 is coupled to male heater controller 412 and configured to sense a temperature of male mandrel 302. Second and Nth mandrel heaters are substantially the same as first mandrel heater, and thus, only first mandrel heater is discussed in detail herein.

As an example, the cartridge heater is configured to use 115 V electricity and provide 400 W of heat in the range of about 200 degrees Fahrenheit plus or minus about 50 degrees Fahrenheit. The sensor may be a Type J thermocouple. Male heater controller 412 is, for example, an ATHENA controller, model number 18-JF-U-B-B-B-0-00-0-AE. Male heater controller 412 operates in a 0-1400 degree Fahrenheit range and is supplied by 115/230 Volt AC power.

Female turret-heater unit 402 includes a female heater controller 418 and a receiver heater associated with each female receiver 304. As shown in FIG. 14, only three receiver heaters are shown. As an example, the first receiver heater is associated with first female receiver 304. First receiver heater includes a first relay 420, a sensor, 422, and a band heater 424 as shown in FIG. 14. First relay 420 is coupled to female heater controller 418 and configured to provide power selectively to band heater 424. Sensor 422 is coupled to female heater controller 418 and configured to sense a temperature of female receiver 304. In an example of use, each female receiver includes an inner surface that faces and engages body 11 and an outer surface that faces opposite the inner surface. Band heater 424 is coupled to the outer surface to provide heat to the inner surface. Second and Nth receiver heaters are substantially the same as first receiver heater, and thus, only first receiver heater is discussed in detail herein.

Insulative cup 10 is made from a multi-layer sheet 80 formed during a cup-manufacturing process. As an example, multi-layer sheet 80 includes a skin 81 and a strip 82 of insulative cellular non-aromatic polymeric material as shown in FIG. 16.

Insulative cup 10 includes, for example, a body 11 having a sleeve-shaped side wall 18 and a floor 20 as shown in FIGS. 15, 17, and 18. Floor 20 is coupled to body 11 and cooperates with side wall 18 to form an interior region 14 therebetween for storing food, liquid, or any suitable product. Body 11 also includes a rolled brim 16 coupled to an upper end of side wall 18 and a floor mount 17 coupled to a lower end of side wall 18 and to floor 20 as shown in FIG. 18.

Insulative cellular non-aromatic polymeric material is configured in accordance with the present disclosure to provide means for enabling localized plastic deformation in at least one selected region of body 11 (e.g., side wall 18, rolled brim 16, floor mount 17, and a floor-retaining flange 26 included in floor mount 17) to provide (1) a plastically deformed first material segment having a first density in a first portion of the selected region of body 11 and (2) a second material segment having a relatively lower second density in an adjacent second portion of the selected region of body 11 as suggested, for example, in FIGS. 15, 17, and 18. In illustrative embodiments, the first material segment is thinner than the second material segment.

Insulative cup 10 is made of a multi-layer sheet 80 as suggested in FIG. 1. Multi-layer sheet 80 comprises a strip 82 of insulative cellular non-aromatic polymeric material laminated with a skin having film layer 54 and ink layer 66 printed on film layer 54 to provide a cup having high-quality graphics as suggested, for example, in FIG. 1.

Film layer 54 is then printed with an ink layer 66. As an example, ink layer 66 includes graphics and the graphics are shown on insulative cup 10 as a pair of triangles in FIG. 17

An insulative cellular non-aromatic polymeric material produced in accordance with the present disclosure can be formed to produce an insulative cup 10. As an example, the insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. As a further example, the insulative cellular non-aromatic polymeric material further comprises a slip agent. The polypropylene base resin has a broadly distributed unimodal (not bimodal) molecular weight distribution.

Insulative cellular non-aromatic polymeric material is used during cup-forming process 100 to make insulative cup 10 as suggested in FIGS. 1-4. Reference is hereby made to U.S. application Ser. No. 13/491,007 filed Jun. 7, 2012 and titled INSULATED CONTAINER for disclosure relating to an insulative container made from an insulative cellular non-aromatic polymeric material, which application is hereby incorporated in its entirety herein. Reference is hereby made to U.S. application Ser. No. 13/491,327 filed Jun. 7, 2012 and titled POLYMERIC MATERIAL FOR AN INSULATED CONTAINER for disclosure relating to such insulative cellular non-aromatic polymeric material, which application is hereby incorporated in its entirety herein.

An unexpected property of multi-layer sheet 80 including strip 82 of insulative cellular non-aromatic polymeric material is its ability when bent to form a round article, such as insulative cup 10. Surface 105 is wrinkle free as is surface 107 as shown in FIG. 18. The roughness of the surfaces 105 and 107 of the present disclosure is such that the depth of creases or wrinkles naturally occurring when subjected to extension and compression forces during cup-forming process 100 is less than about 100 microns and even less than about 5 microns in most instances. At less than about 10 microns, the creases or wrinkles are not visible to the naked eye.

In addition to surface topography and morphology, another factor that was found to be beneficial to obtain a high quality insulative cup free of creases was the anisotropy of the insulative cellular non-aromatic polymeric strip. Aspect ratio is the ratio of the major axis to the minor axis of the cell. As confirmed by microscopy, in one exemplary embodiment the average cell dimensions in a machine direction (machine or along the web direction) of an extruded strip 82 of insulative cellular non-aromatic polymeric material was about 0.01954 inches (0.50 mm) in width by about 0.00853 inches (0.22 mm) in height. As a result, a machine direction cell size aspect ratio is about 2.29. The average cell dimensions in a cross direction (cross-web or transverse direction) was about 0.01845 inches (0.47 mm) in width and about 0.00828 inches (0.21 mm) in height. As a result, a cross-direction aspect ratio is about 2.23. In one exemplary embodiment, it was found that for the strip to withstand compressive force during cup forming; one desirable average aspect ratio of the cells was between about 1.0 and about 3.0. In one exemplary embodiment one desirable average aspect ratio of the cells was between about 1.0 and about 2.0.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 0.1 and about 3. In one exemplary embodiment, the coefficient of anisotropy was about 1.1.

If the circumference of the cup is aligned with machine direction of strip 82 with a cell aspect ratio exceeding about 3.0, deep creases with depth exceeding about 200 microns are typically formed on an inside surface of the cup making it unusable. Unexpectedly, it was found, in one exemplary embodiment, that if the circumference of the cup was aligned in the cross direction of extruded strip 82, which can be characterized by cell aspect ratio below about 2.0, no deep creases were formed inside of the cup, indicating that the cross direction of strip 82 was more resistant to compression forces during cup formation.

One possible reason for greater compressibility of an extruded strip with cells having aspect ratio below about 2.0 in the direction of cup circumference, such as in the cross direction, could be due to lower stress concentration for cells with a larger radius. Another possible reason may be that the higher aspect ratio of cells might mean a higher slenderness ratio of the cell wall, which is inversely proportional to buckling strength. Folding of the strip into wrinkles in the compression mode could be approximated as buckling of cell walls. For cell walls with longer length, the slenderness ratio (length to diameter) may be higher. Yet another possible factor in relieving compression stress might be a more favorable polymer chain packing in cell walls in the cross direction allowing polymer chain re-arrangements under compression force. Polymer chains are expected to be preferably oriented and more tightly packed in machine direction.

In exemplary embodiments, cell aspect ratio is about 2.0 when the formed cup circumference is aligned in the direction of extruded strip. As a result, the surface of extruded strip with crystal domain size below about 100 angstroms facing inside the cup may provide favorable results of achieving a desirable surface topography with imperfections less than about 5 microns deep. In addition, it has been found that the use of heated male mandrels 302 and heated female receivers 304 minimizes the formation of deep creases on the inside of the cup.

In one aspect of the present disclosure, the polypropylene resin (either the base or the combined base and secondary resin) may have a density in a range of about 0.01 g/cm$^3$ to about 0.19 g/cm$^3$. In one exemplary embodiment, the density may be in a range of about 0.05 g/cm³ to about 0.19 g/cm³. In one exemplary embodiment, the density may be in a range of about 0.1 g/cm³ to about 0.185 g/cm³.

It has been found during development of the present disclosure that if the circumference of insulative cup 10 is aligned with the machine direction of strip 82 of insulative cellular non-aromatic polymeric material, deep creases with a depth in excess of about 200 microns are typically formed on surface 107. Unexpectedly, it has been determined that if the circumference of insulative cup 10 is aligned generally perpendicular to machine direction, the formation of deep creases on surface 107 may be lessened to some extent, indicating that the cross-direction to the machine direction of extruded insulative cellular non-aromatic polymeric material is resistant to compression forces during formation of insulative cup 10. It is believed that this is a result of the orientation of the polymer chains of extruded insulative cellular non-aromatic polymeric material which are oriented and more tightly packed in machine direction.

Body 11 is formed from a strip 82 of insulative cellular non-aromatic polymeric material as disclosed herein. In accordance with the present disclosure, strip 82 of insulative cellular non-aromatic polymeric material is configured through application of pressure and heat (though in exemplary embodiments configuration may be without application of heat) to provide means for enabling localized plastic deformation in at least one selected region of body 11 to provide a plastically deformed first sheet segment having a first density located in a first portion of the selected region of body 11 and a second sheet segment having a second density lower than the first density located in an adjacent second portion of the selected region of body 11 without fracturing the sheet of insulative cellular non-aromatic polymeric material so that a predetermined insulative characteristic is maintained in body 11.

Sleeve-shaped side wall 18 includes an upright inner tab 514, an upright outer tab 512, and an upright fence 513 as suggested in FIG. 18. Upright inner tab 514 is arranged to extend upwardly from floor 20 and configured to provide the first sheet segment having the first density in the first 101 of the selected regions of body 11. Upright outer tab 512 is arranged to extend upwardly from floor 20 and to mate with upright inner tab 514 along an interface I therebetween as suggested in FIG. 16. Upright fence 513 is arranged to interconnect upright inner and outer tabs 514, 512 and surround interior region 14. Upright fence 513 is configured to provide the second sheet segment having the second density in the first 101 of the selected regions of body 11 and cooperate with upright inner and outer tabs 514, 512 to form sleeve-shaped side wall 18 as suggested in FIGS. 15, 17, and 18.

Rolled brim 16 is coupled to an upper end of sleeve-shaped side wall 18 to lie in spaced-apart relation to floor 20 and to frame an opening into interior region 14. Rolled brim 16 includes an inner rolled tab 164, an outer rolled tab 162, and a rolled lip 163 as suggested in FIGS. 15, 17, and 18. Inner rolled tab 164 is configured to provide the first sheet segment in the second 102 of the selected regions of body 11. Inner rolled tab 164 coupled to an upper end of upright outer tab 512 included in sleeve-shaped side wall 18. Outer rolled tab 162 is coupled to an upper end of upright inner tab 514 included in sleeve-shaped side wall 18 and to an outwardly facing exterior surface of inner rolled tab 164. Rolled lip 163 is arranged to interconnect oppositely facing side edges of each of inner and outer rolled tabs 164, 162. Rolled lip 163 is configured to provide the second sheet segment having the second density in the second 102 of the selected region of body 11 and cooperate with inner and outer rolled tabs 164, 162 to form rolled brim 16 as suggested in FIG. 15.

Floor mount 17 is coupled to a lower end of sleeve-shaped side wall 18 to lie in spaced-apart relation to rolled brim 16 and to floor 20 to support floor 20 in a stationary position relative to sleeve-shaped side wall 18 to form interior region 14. Floor mount 17 includes a web-support ring 126, a floor-retaining flange 26, and a web 25. Web-support ring 126 is coupled to the lower end of sleeve-shaped side wall 18 and configured to provide the second sheet segment having the second density in the third 103 of the selected regions of body 11. Floor-retaining flange 26 is coupled to floor 20 and arranged to be surrounded by web-support ring 126. Web 25 is arranged to interconnect floor-retaining flange 26 and web-support ring 126. Web 25 is configured to provide the first sheet segment having the first density in the third 103 of the selected regions of body 11.

Floor-retaining flange 26 includes an alternating series of upright thick and thin staves arranged in side-to-side relation to extend upwardly from web 25 toward interior region 14 bounded by sleeve-shaped side wall 18 and floor 20. A first 261 of the upright thick staves is configured to include a right side edge extending upwardly from web 25 toward interior region 14. A second 262 of the upright thick staves is configured to include a left side edge arranged to extend upwardly from web 25 toward interior region 14 and lie in spaced-apart confronting relation to right side edge of the first 261 of the upright thick staves. A first 260 of the upright thin staves is arranged to interconnect left side edge of the first 261 of the upright thick staves and right side edge of the second 262 of the upright thick staves and to cooperate with left and right side edges to define therebetween a vertical channel 263 opening inwardly into a lower interior region bounded by floor-retaining flange 26 and a horizontal platform 21 included in floor 20 and located above floor-retaining flange 26. The first 260 of the upright thin staves is configured to provide the first sheet segment in the fourth 104 of the selected regions of body 11. The first 261 of the upright thick staves is configured to provide the second sheet segment in the fourth 104 of the selected regions of the body 11.

An insulative cup formed from a non-expanded polystyrene material having a layer of printed film adhered thereto may be considered non-recyclable because it would require the segregation of the film layer, which would not be desirable to introduce as part of the regrind into the extrusion process. Recyclability of articles formed using the insulative cellular non-aromatic polymeric material of the present disclosure minimize the amount of disposable waste created. In comparison, beaded expanded polystyrene cups that break up into beads and thus ordinarily cannot be reused easily in a manufacturing process with the same material from which the article was formed. In addition, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

The invention claimed is:

1. A method of making a plastic cup, the method comprising the steps of
providing a plastic cup body blank and a the cup consist of a plastic floor blank, each of the cup body blank and the floor blank being made from insulative cellular non-aromatic polymeric material,
heating the cup body blank, heating a male mandrel to provide a heated male mandrel, folding the cup body blank around the heated male mandrel after heating the cup body blank, transferring heat from the heated male mandrel to the cup body blank to minimize stress in the insulative cellular non-aromatic polymeric material so that formation of visible imperfections in the cup are minimized during the folding step, joining an outer tab of the cup body blank and an inner tab of the cup body blank together to form a cup side wall, coupling the floor blank to the cup side wall to form a cup body on the heated male mandrel, warming a female receiver to provide a heated female receiver, transferring the cup body from the heated male mandrel to the heated female receiver, and curling a top edge of the cup body to form a rolled brim on the cup body to establish a plastic cup.

2. The method of claim 1, further comprising the step of orienting the cup body blank to cause a circumference of the rolled brim to be aligned transverse to a machine direction established during formation of the insulative cellular non-aromatic polymeric material.

3. The method of claim 1, wherein the heated male mandrel has a temperature between about 150 degrees Fahrenheit and about 250 degrees Fahrenheit.

4. The method of claim 3, wherein the heating step includes the steps of providing a cartridge heater coupled to the male mandrel and using the cartridge heater to apply heat to the male mandrel to establish the heated male mandrel.

5. The method of claim 4, further comprising the step of controlling application of heat to the male mandrel from the cartridge heater using a mandrel heat controller coupled to the cartridge heater.

6. The method of claim 5, further comprising the step of sensing the temperature of the heated male mandrel with a sensor associated with the male mandrel and coupled to the mandrel heat controller to communicate the temperature of the heated male mandrel to the mandrel heat controller.

7. The method of claim 1, wherein the heated female receiver has a temperature between about 100 degrees Fahrenheit and about 250 degrees Fahrenheit.

8. The method of claim 7, wherein the warming step includes the steps of providing a band heater coupled to the female receiver and using the band heater to apply heat to the female receiver to establish the heated female receiver.

9. The method of claim 8, further comprising the step of controlling application of heat to the female receiver from the band heater using a receiver heat controller coupled to the female receiver.

10. The method of claim 9, further comprising the step of sensing the temperature of the heated female receiver with a sensor associated with the female receiver and coupled to receiver heat controller to communicate the temperature of the heated female receiver to the receiver heat controller.

11. The method of claim 3, wherein the heated male mandrel has a temperature of about 200 degrees Fahrenheit and the heated female receiver has a temperature of about 175 degrees Fahrenheit.

12. The method of claim 1, wherein the heated male mandrel has a temperature of about 140 degrees Fahrenheit.

13. The method of claim 1, further comprising the step of applying a lubricant to the top edge of the cup body prior to the curling step.

14. The method of claim 1, further comprising the step of pre-curling the top edge of the cup body prior to the curling step.

15. The method of claim 1, further comprising the steps of loading the cup body blank on a loading turret prior to the folding step.

16. The method of claim 1, further comprising the step of inserting the cup floor blank into a floor-receiving space formed in the heated male mandrel prior to the coupling step.

17. The method of claim 16, further comprising the step of bonding the cup floor blank to the cup side wall.

18. The method of claim 1, wherein the male mandrel is rotatable about a first axis and the female receiver is rotatable about a second axis located in spaced-apart relation to the first axis.

19. The method of claim 1, further comprising the step of forming the cup side wall after the heating step to cause any creases in the cup side wall to have a depth of less than about 100 microns.

20. The method of claim 19, wherein any creases in the cup side wall have a depth of less than about 5 microns.

21. The method of claim 1, wherein cells included in the insulative cellular non-aromatic polymeric material have a cell aspect ratio of between about 1.0 and about 3.0.

22. The method of claim 21, wherein the cell aspect ratio is between about 1.0 and about 2.0.

23. The method of claim 21, wherein the insulative cellular non-aromatic polymeric material has an average cell dimension of about 0.01954 inches in width and about 0.00853 inches in length.

24. The method of claim 21, wherein the insulative cellular non-aromatic polymeric material has an average cell dimension of about 0.01854 inches in width and about 0.00828 inches in length.

25. The method of claim 1, further comprising the step of deforming plastically a selected region of the cup body to provide a plastically deformed first material segment having a first density in a first portion of the selected region of the cup body and a second material segment having a relatively lower second density in an adjacent second portion of the cup body.

26. The method of claim 1, wherein the heated male mandrel has a temperature between about 100 degrees Fahrenheit and about 250 degrees Fahrenheit.

27. The method of claim 26, wherein the heated male mandrel has a temperature of about 200 degrees Fahrenheit.

28. The method of claim 1, wherein the heating step uses a heat-control system that includes a power source and a mandrel heater coupled to the male mandrel to provide heat to the male mandrel in response to receiving power from the power source.

29. The method of claim 28, wherein the heat-control system further includes a mandrel heater controller coupled to the power source and to the mandrel heater to cause power to be supplied to the mandrel heater so that the heated male mandrel is maintained.

30. The method of claim 29, wherein the mandrel heater is a cartridge heater.

31. The method of claim 30, wherein the male mandrel is formed to include a bore and the cartridge heater is arranged to lie in the bore.

32. The method of claim 31, wherein the male mandrel is formed to include first, second, and third bores arranged to lie in spaced-apart relation to one another to define an equilateral triangle shape.

33. The method of claim 32, wherein the male mandrel includes an outer surface, each bore is defined by an associated inner surface, and the inner surface of each bore is spaced apart from the outer surface of the male mandrel by about 0.08 inches.

34. The method of claim 29, wherein the heat-control system is coupled to the female receiver and configured to provide means for heating the female receiver to establish a heated female receiver to cause heat from the heated female receiver to be transferred to the cup body.

35. The method of claim 34, wherein the heat-control system further includes a receiver heater coupled to the female receiver to heat the female receiver.

36. The method of claim 35, wherein the heat-control system further includes a receiver heater controller coupled to the power source and the receiver heater to cause power to be supplied to the receiver heater so that the heated female receiver is maintained.

37. The method of claim 36, wherein the mandrel heater controller includes a mandrel sensor arranged to sense a temperature of the heated male mandrel.

38. The method of claim 37, wherein the receiver heater controller includes a receiver sensor arranged to sense a temperature of the heated female receiver.

39. The method of claim 35, wherein the receiver heater is a band heater.

40. The method of claim 39, wherein the female receiver includes an inner surface and an outer surface and the band heater is coupled to the outer surface.

41. The method of claim 35, wherein the heat-control system further includes a male-turret slip ring arranged to interconnect the power source and the mandrel heater and a female-turret slip ring arranged to interconnect the power source and the receiver heater.

42. The method of claim 1, wherein the male mandrel is formed to include a floor-receiving space therein and a floor of a cup body is arranged to lie in the floor-receiving space.

* * * * *